United States Patent [19]

Matsumoto

[11] Patent Number: 5,673,362
[45] Date of Patent: Sep. 30, 1997

[54] SPEECH SYNTHESIS SYSTEM IN WHICH A PLURALITY OF CLIENTS AND AT LEAST ONE VOICE SYNTHESIZING SERVER ARE CONNECTED TO A LOCAL AREA NETWORK

[75] Inventor: Tatsuro Matsumoto, Kawasaki, Japan

[73] Assignee: Fujitsu Limited, Kawasaki, Japan

[21] Appl. No.: 975,466

[22] Filed: Nov. 12, 1992

[30] Foreign Application Priority Data

Nov. 12, 1991 [JP] Japan .................. 3-295621

[51] Int. Cl.⁶ .................................. G01L 5/02
[52] U.S. Cl. ............... 395/2.69; 395/2.6; 395/2.67; 395/2.71; 395/2.79
[58] Field of Search ................ 395/2.69; 381/51, 381/52

[56] References Cited

U.S. PATENT DOCUMENTS

| | | | |
|---|---|---|---|
| 4,757,497 | 7/1988 | Beierle et al. | 370/85.12 |
| 4,849,966 | 7/1989 | Willis et al. | 370/85 |
| 4,872,202 | 10/1989 | Fette | 395/2.69 |
| 4,975,957 | 12/1990 | Ichikawa et al. | 381/36 |
| 5,127,003 | 6/1992 | Doll, Jr. et al. | 370/110.1 |
| 5,283,897 | 2/1994 | Georgiadis et al. | 395/650 |

FOREIGN PATENT DOCUMENTS

| | | |
|---|---|---|
| 0 239394 | 9/1987 | European Pat. Off. . |
| 2 174 330 | 5/1990 | Japan . |

OTHER PUBLICATIONS

"Beyond the 'Reading Machine': Combining Smart Text-To-Speech with an AI-Based Dialogue Generator," M. H. O'Malley et al., Speech Technology, vol. 3, No. 3, Sep. 1986, New York, pp. 34–40.

"Ein Vollsynthetisches Sprachausgabesystem," Von K. P. Fahnrich et al., Technische Rundschau, vol. 79, No. 9, Feb. 27, 1987, Bern, pp. 64–67.

"Japanese Text-To-Speech Synthesizer," K. Nagakura et al., Review of the Electrical Communications Laboratories, vol. 36, No. 5, 1988, Tokyo, pp. 451–457.

*Primary Examiner*—Allen R. MacDonald
*Assistant Examiner*—Alphonso A. Collins
*Attorney, Agent, or Firm*—Staas & Halsey

[57] ABSTRACT

The data control unit in the voice synthesizing server of the present invention receives from a client data to be processed to synthesize voice, and determines the type of the received data. If the received data are text data, they are outputted to the pronunciation symbol generating unit to generate pronunciation symbols. If the received data are pronunciation symbols, they are outputted to the acoustic parameter generating unit to generate acoustic parameters. If the received data are acoustic parameters, they are outputted to the waveform generating unit to generate voice waveforms, and the generated voice waveforms are sent from the data sending unit to the client. The client receives the voice waveforms from the voice generating server, and outputs the received voice waveforms as voice from the voice output unit.

7 Claims, 27 Drawing Sheets

| ABBREVIATIONS AND NUMBERS, ETC. IN TEXT DATA | READING |
|---|---|
| IMF | [ai em ef] |
| 1991 | nineteen ninety-one |
| 16:25 | sixteen twenty-five |

Fig. 9

SPEECH SYNTHESIS SYSTEM IN WHICH A PLURALITY OF CLIENTS AND AT LEAST ONE VOICE SYNTHESIZING SERVER ARE CONNECTED TO A LOCAL AREA NETWORK

BACKGROUND OF THE INVENTION

1. Field of the Invention

The present invention relates to a speech synthesis system in which a plurality of clients and at least one voice synthesizing server are connected to a local area network (LAN).

2. Description of the Related Art

Systems for synthesizing voice from text data at a client's request and transmitting the result to the client have become popular. These systems include a voice synthesizing server and more than one client on a LAN. FIG. 1 shows a basic configuration of such systems. A client 1 include a text input unit 11, a text sending unit 12, a waveform receiving unit 13, and a voice output unit 15. A voice synthesizing server 2 includes a text receiving unit 21 for receiving text data sent from the text sending unit 12, a pronunciation symbol generating unit 22, an acoustic parameter generating unit 23, a waveform generating unit 24, and a waveform sending unit 26 for sending to the client 1 a voice waveform synthesized by the waveform generating unit When text data are applied from the text input unit 11 of the client 1, the text sending unit 12 sends the text data to the voice synthesizing server 2. The voice synthesizing server 2 receives at the text receiving unit 21 the text data sent by the text sending unit 12, and the pronunciation symbol generating unit 22 converts the text data to pronunciation symbol strings representing how the data are actually pronounced. Then, the acoustic parameter generating unit 23 converts the pronunciation symbol strings to voice-parameters-in-time-series, and the waveform generating unit 24 generates voice waveforms according to the voice-parameters-in-time-series. Thus, the waveform sending unit 26 sends the generated voice waveform to the client 1.

The client 1 receives a voice waveform at the waveform receiving unit 13, and the voice output unit 15 regenerates the voice waveform as voice.

The above described conventional speech synthesis system has a problem in that there is heavy traffic in a LAN because the system transmits voice data (synthesized voice waveforms) directly between the client 1 and the voice synthesizing server 2.

Additionally, since the conventional speech synthesis systems execute communication between a server and a client using fixed type data regardless of the server's and the client's resources (functions), they have another problem in that the resources of the client 1 are not made use of much. That is, although the client 1 has the function of generating a pronunciation symbol using the system shown in FIG. 1, the data sent from the client 1 to the voice synthesizing server 2 are text data only. Thus, the function of the client 1 is not utilized efficiently.

The client 1 may not have a D/A converting function, and a user of such a client 1 cannot regenerate digital data sent from the voice synthesizing server 2. Therefore, the conventional systems have a further problem that only clients having the D/A converting function can receive voice data.

Recently, dictionary retrieving systems have become popular, too. These systems comprise, in the above described local area network, a dictionary retrieving server for storing of word data. When a user of the client 1 requests the retrieval of a specific word, the dictionary retrieving server retrieves the meaning and the phonetic symbols of the word, and transmits the total information to the client. When a word is retrieved, it is very convenient to obtain the meaning and the vocal information of the pronunciation of the word. However, no conventional systems have the function.

Also, commonly used are schedule managing systems for storing schedule data inputted by a user and for informing the user of the data through a message, etc. when the scheduled date has arrived. Such systems are more useful if they vocally output the content of the schedule. However, no conventional systems cover such functions.

SUMMARY OF THE INVENTION

A first object of the present invention is to reduce the traffic in a LAN by reducing the amount of data to be transmitted through the LAN.

A second object of the present invention is to reduce the load of a voice synthesizing server and the traffic in a LAN by controlling the kinds of data transmitted between a voice synthesizing server and a client according to their capabilities.

A third object of the present invention is to provide a speech synthesis system capable of enabling a user of a client having no D/A converting function to be informed of synthesized voice.

A fourth object of the present invention is to provide a system for vocally informing of the pronunciation of a word or the content of a schedule.

In a speech synthesis system in which plural clients and at least one voice synthesizing server are connected to a local area network, a client according to the first principle of the present invention includes a data input unit for receiving data, a waveform synthesizing unit for decoding an encoded voice waveform, and a voice output unit for outputting the decoded voice waveform as voice.

The voice synthesizing server includes a waveform generating unit for generating a voice waveform according to the data sent from the client, and a waveform encoding unit for encoding the voice waveform.

When data to be processed are applied from the data input unit of the client, the data are sent to the voice synthesizing server through a local area network (LAN). The waveform generating unit in the voice synthesizing server generates a voice waveform according to the data, encodes the generated voice waveform, and sends it to the client. The client decodes the encoded voice waveform received from the voice synthesizing server, and outputs it as voice.

Thus, sending encoded voice waveforms from a voice synthesizing server to a LAN reduces the amount of transmission data and the traffic in the LAN.

A voice synthesizing server in a speech synthesis system according to the second principle of the present invention includes a pronunciation symbol generating unit for generating a pronunciation symbol according to the text data sent from a client, an acoustic parameter generating unit for generating an acoustic parameter according to a pronunciation symbol, a waveform generating unit for synthesizing a voice waveform according to the acoustic parameter, a data receiving unit for receiving data, a data sending unit for sending data, and a data control unit for controlling such that when the data receiving unit receives text data, they are outputted to the pronunciation symbol generating unit, when it receives pronunciation symbols, they are outputted to the acoustic parameter generating unit, and when it receives acoustic parameters, they are outputted to the waveform generating unit.

When the voice synthesizing server receives text data from the client, it generates pronunciation symbols according to the received text data. When it receives pronunciation symbols, it generates acoustic parameters according to the pronunciation symbols. When it receives acoustic parameters, it generates voice waveforms according to the acoustic parameters.

Thus, when a client has the function of generating a pronunciation symbol or an acoustic parameter, the load of the voice synthesizing server can be reduced because a pronunciation symbol or an acoustic parameter need not be generated.

BRIEF DESCRIPTION OF THE DRAWINGS

FIG. 9 shows the correspondence table of abbreviations and numbers and how to read them;

PREFERRED EMBODIMENTS OF THE PRESENT INVENTION

Figure 1:
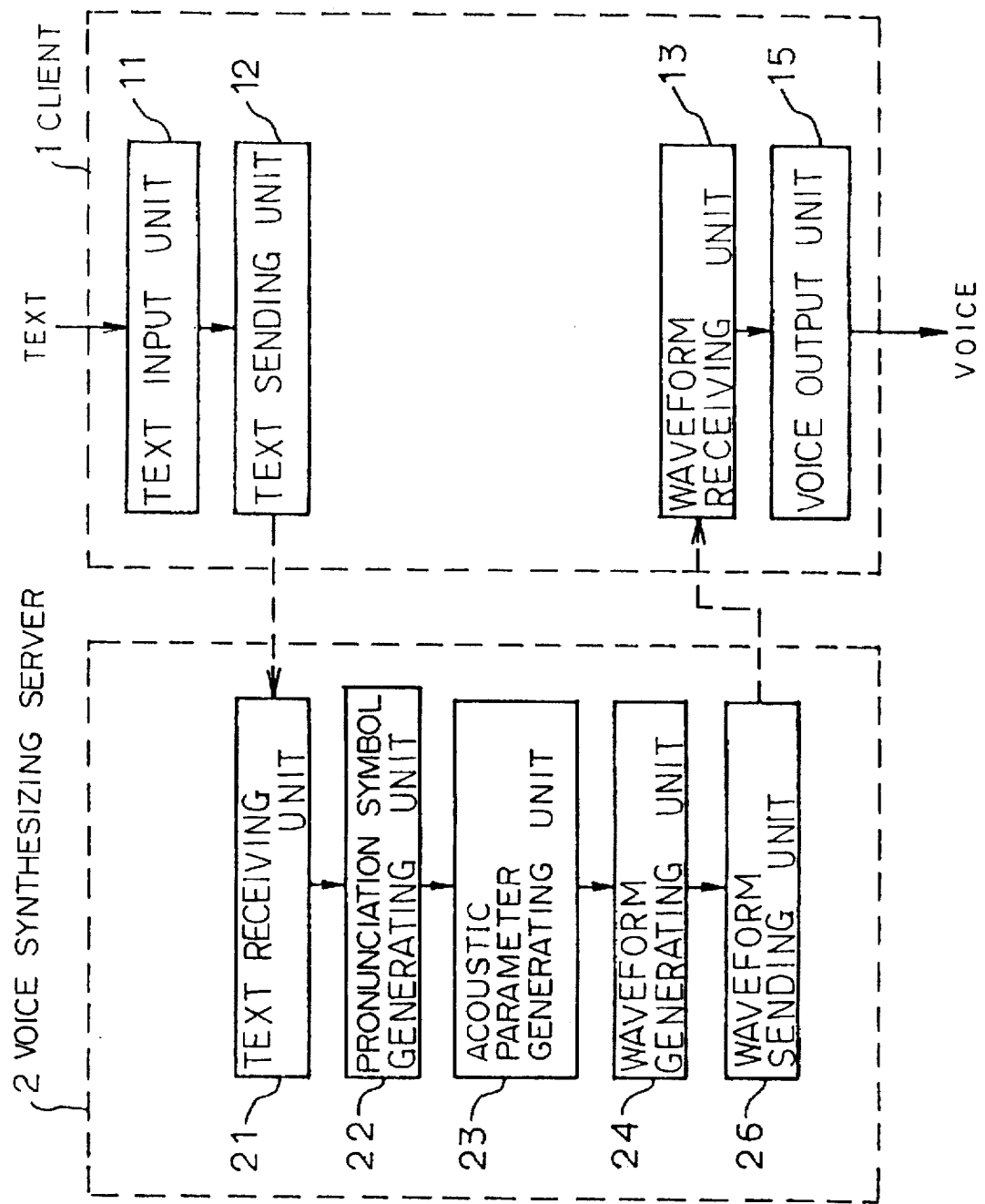
FIG. 1 shows a configuration of a conventional speech synthesis system.
Figure 2:
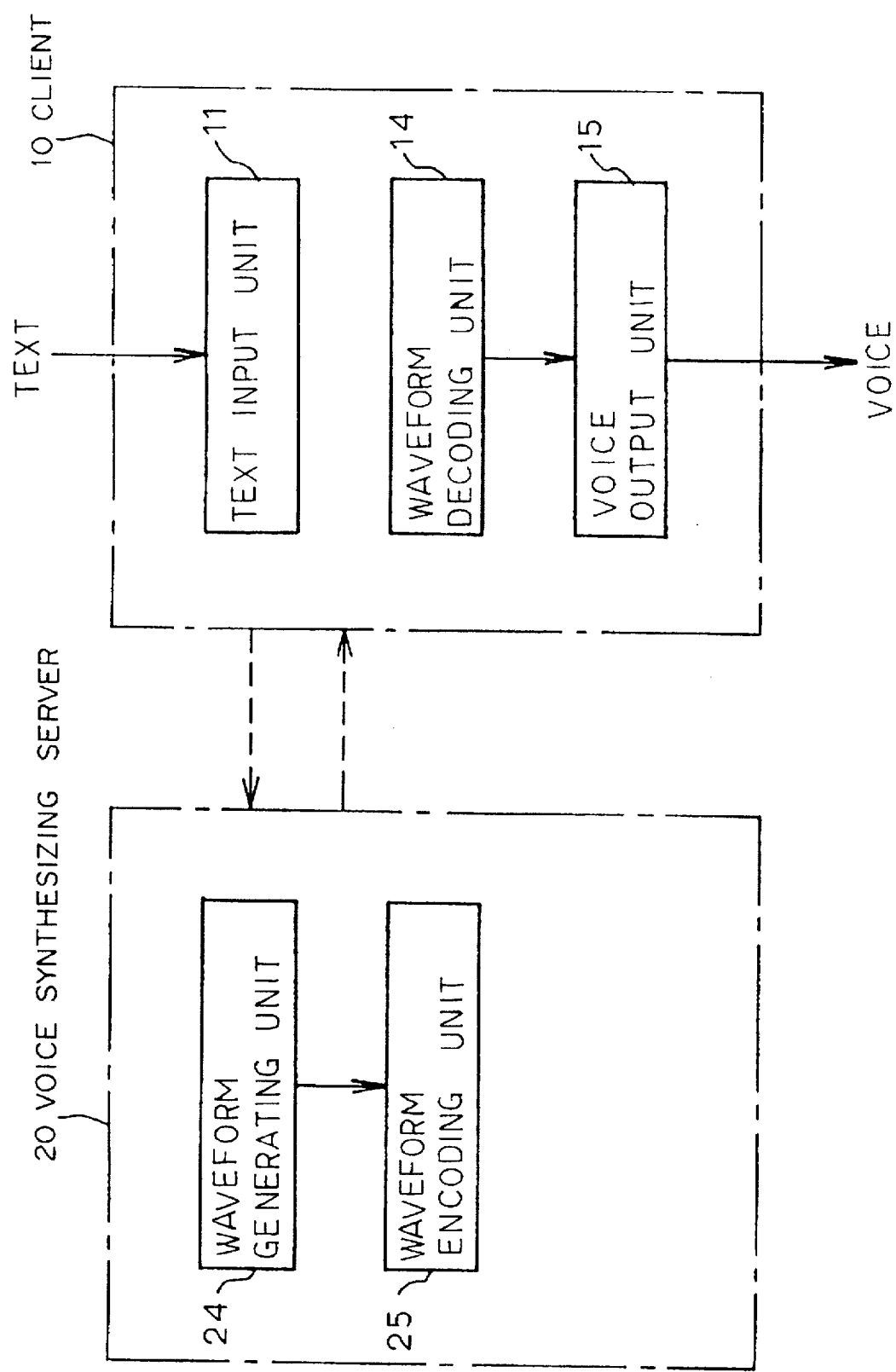
FIG. 2 shows the first principle of the present invention.

Preferred embodiments of the present invention are described below by referring to the attached drawings. FIG. 2 shows the first principle of the present invention, and shows the basic configuration comprising a client 10 and a voice synthesizing server 20 connected to a local area network (LAN).

In the first principle of the present invention shown in FIG. 2, the text input unit 11 of the client 10 receives data to be processed to synthesize voice. A waveform decoding unit 14 decodes an encoded voice waveform sent from the voice synthesizing server 20, and the voice output unit 15 outputs the decoded voice waveform as voice.

The waveform generating unit 24 in the voice synthesizing server 20 generates a voice waveform according to the data sent from the client 10. A waveform encoding unit 25 encodes a voice waveform generated by the waveform generating unit 24.

In an embodiment according to the first principle of the present invention shown in FIG. 2, the waveform generating unit 24 in the voice synthesizing server 20 generates a voice waveform corresponding to the data sent from the client 10, encodes the voice waveform, and sends it to the client 10.

The client 10 decodes at the decoding unit 14 the received voice waveform, obtaining the original voice waveform, and outputs it as voice from the voice output unit 15.

Since the voice synthesizing server 20 sends to the LAN compressed data (encoded voice waveforms), the amount of the transmission data and the traffic in the LAN can be reduced.

Figure 3:
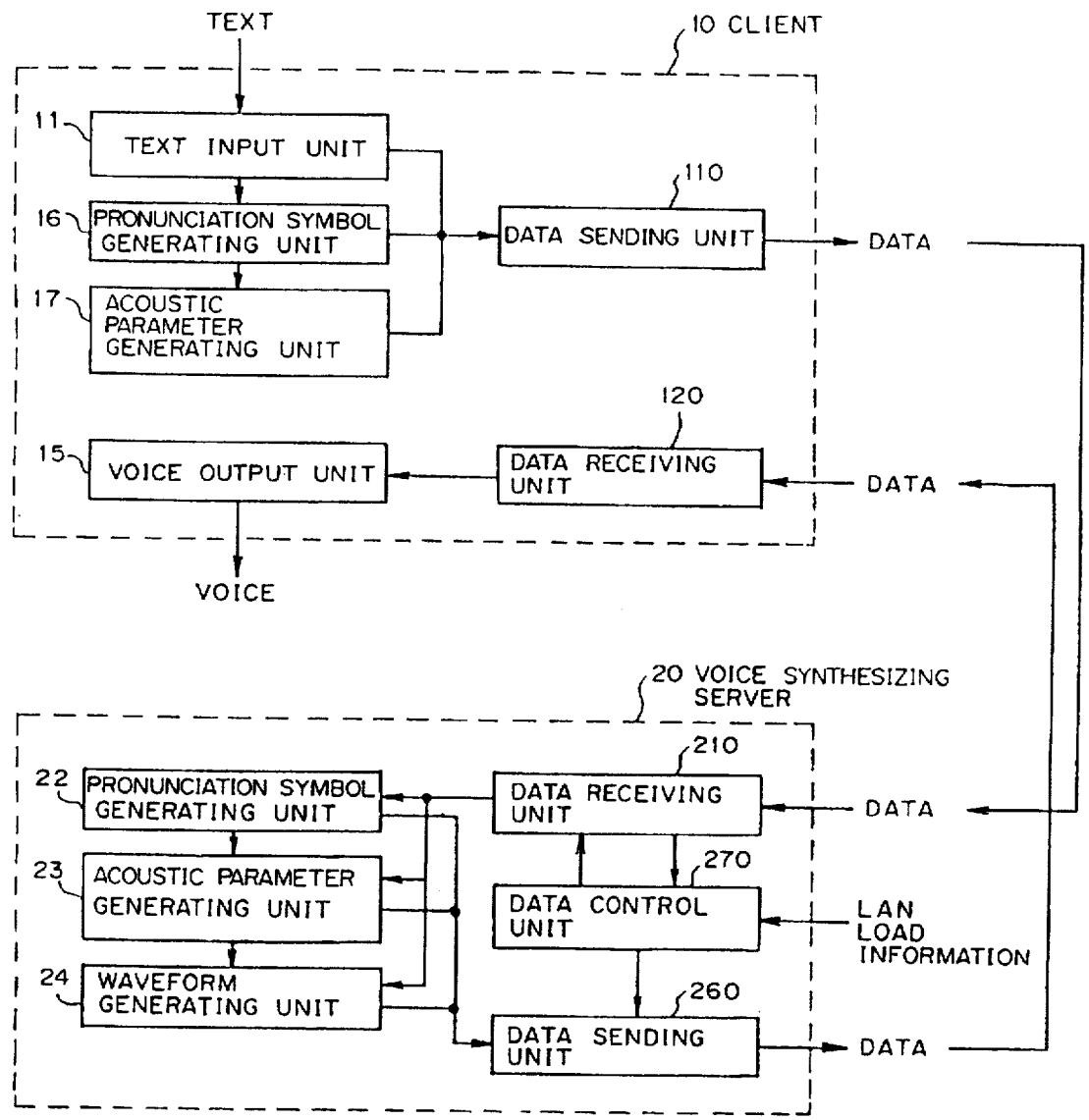
FIG. 3 shows the second principle of the present invention.

In the second principle of the present invention shown in FIG. 3, a pronunciation symbol generating unit 16 of the client 10 generates pronunciation symbols (pronunciation symbol strings) according to the text data inputted to the text input unit 11. Pronunciation symbols refer to symbols for representing the pronunciation, accentuation, intonation, etc. for inputted text data.

An acoustic parameter generating unit 17 generates acoustic parameters (voice-parameters-in-time-series).

A data sending unit 110 sends a pronunciation symbol to the voice synthesizing server 20 when the client 10 includes the text input unit 11 and the pronunciation symbol generating unit 16, and sends an acoustic parameter to the voice synthesizing server 20 when the client 10 includes the text input unit 11, the pronunciation symbol generating unit 16, and the acoustic parameter generating unit 17. A data receiving unit 120 receives a voice waveform outputted from the voice synthesizing server 20.

A data receiving unit 210 in the voice synthesizing server 20 receives data sent from the client 10.

The pronunciation symbol generating unit 22 generates a pronunciation symbol according to the text data received by the data receiving unit 210.

The acoustic parameter generating unit 23 generates an acoustic parameter according to the pronunciation symbol.

The waveform generating unit 24 synthesizes a voice waveform according to the acoustic parameter.

A data control unit 270 controls such that when the data receiving unit 210 receives text data, they are outputted to the pronunciation symbol generating unit 22; when it receives pronunciation symbols, they are outputted to the acoustic parameter generating unit 23; and when it receives acoustic parameters, they are outputted to the waveform generating unit 24.

According to the second principle of the present invention shown in FIG. 3, the client 10 includes, in addition to the voice output unit 15, the data sending unit 110, and the data receiving unit 120; and (i) the text input unit 11 only, (ii) the text input unit 11 and the pronunciation symbol generating unit 16, or (iii) the text input unit 11, the pronunciation symbol generating unit 16, and the acoustic parameter generating unit 17.

When the client 10 has the configuration (i), text data are sent from the data sending unit 110 to the voice synthesizing server 20. When the client 10 has the configuration (ii), a pronunciation symbol is sent from the data sending unit 110 to the voice synthesizing server 20. When the client 10 has the configuration (iii), an acoustic parameter is sent from the data sending unit 110 to the voice synthesizing server 20.

When the voice synthesizing server 20 receives text data from the client (10), it outputs the received text data to the pronunciation symbol generating unit 22 to generate a pronunciation symbol. When it receives a pronunciation symbol, it outputs the received pronunciation symbol to the acoustic parameter generating unit 23 to generate an acoustic parameter. When it receives an acoustic parameter, it outputs the received acoustic parameter to the waveform generating unit 24 to synthesize a voice waveform.

At this time, the client 10 sends data to the voice synthesizing server 20 depending on its capabilities. Therefore, if the client 10 has the function of generating a pronunciation symbol or an acoustic parameter, the voice synthesizing server 20 need not generate a pronunciation symbol or an acoustic parameter, thereby reducing the load of the voice synthesizing server 20.

Figure 4:
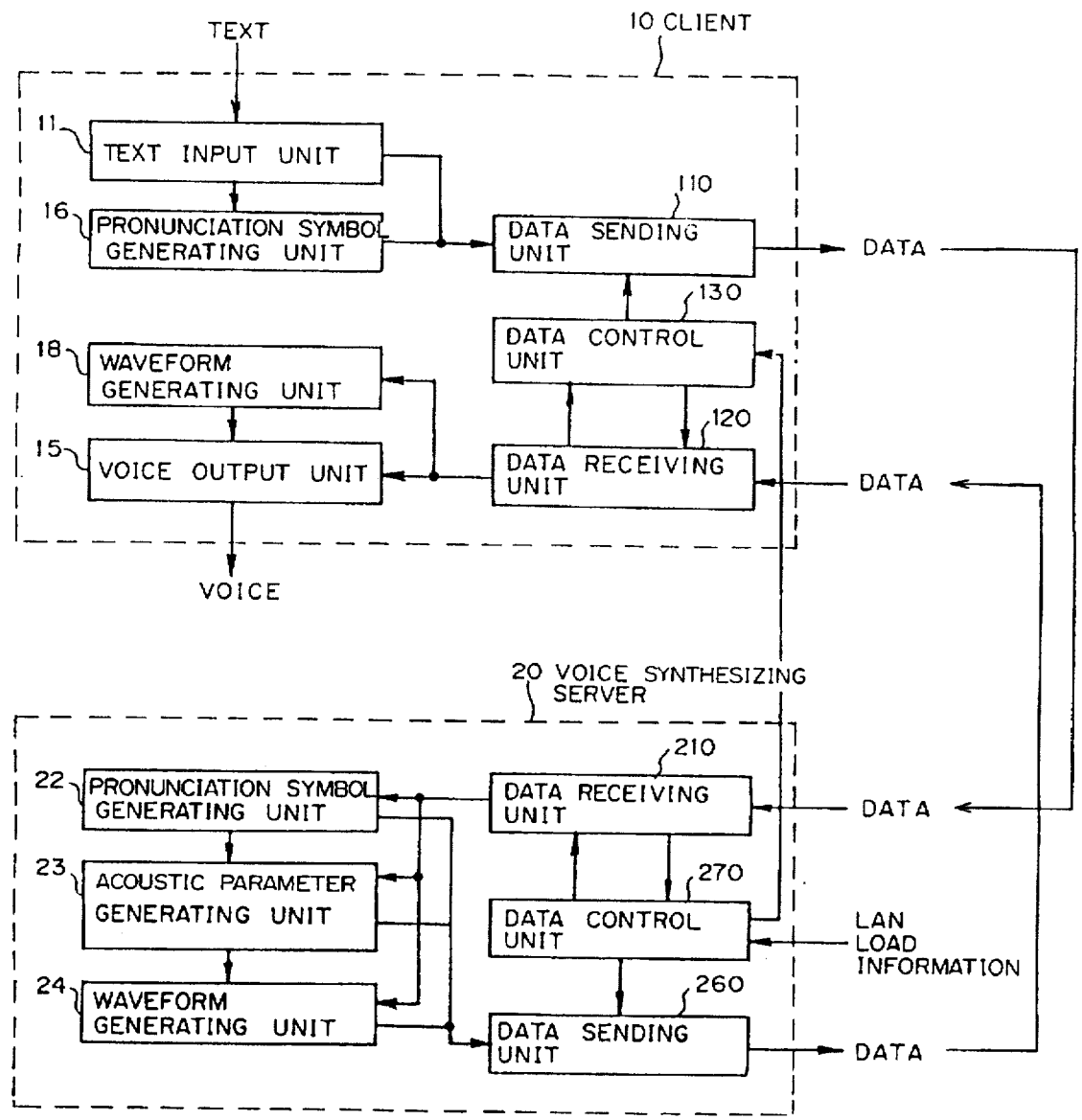
FIG. 4 shows the third principle of the present invention.

According to the third principle of the present invention shown in FIG. 4, the client 10 includes, in addition to the configuration of the second principle shown in FIG. 3, a control unit 130 for controlling data.

According to the instruction of the voice synthesizing server 20, the data control unit 130 in the client 10 selects between sending text data, a pronunciation symbol, or an acoustic parameter from the data sending unit 110 to the voice synthesizing server 20.

The data control unit 270 of the voice synthesizing server 20 controls such that when the data receiving unit 210 receives text data, they are outputted to the pronunciation symbol generating unit 22; when it receives pronunciation symbols, they are outputted to the acoustic parameter generating unit 23; and when it receives acoustic parameters, they are outputted to the waveform generating unit 24.

In the third principle of the present invention shown in FIG. 4, the client 10 includes (i) the text input unit 11 only, (ii) the text input unit 11 and the pronunciation symbol generating unit 16, or (iii) the text input unit 11, the pronunciation symbol generating unit 16, and the acoustic parameter generating unit 17 (refer to FIG. 3).

When the data control unit 270 in the voice synthesizing server 20 receives from the client 10 a request for voice data, it determines the type of data to be sent from the client 10 to the voice synthesizing server 20 according to the load of the voice synthesizing server 20, the load of the LAN, and the data generated by the requesting client 10, and then informs of the resultant type of data the data control unit 130 in the client 10. Otherwise, the data control unit 270 in the voice synthesizing server 20 informs the data control unit 130 in the client 10 of the load of the voice synthesizing server 20 and the load of the LAN. According to the information, the data control unit 130 in the client 10 determines the type of data to be sent.

For example, when the voice synthesizing server (20) is charged with a large load, the data control unit 270 in the voice synthesizing server 20 instructs the data control unit 130 in the client 10 to send the data of the type generated by the client 10. The data control unit 130 in the client 10 instructs the data sending unit 110 to send the data specified by the voice synthesizing server 20.

Practically, when the client 10 has the above described configuration (ii), the data control unit 130 of the client 10 instructs the data sending unit 110 to send a pronunciation symbol. When it has the configuration (iii), the data control unit 130 instructs the data sending unit 110 to send an acoustic parameter.

By contrast, when the voice synthesizing server 20 is charged with a small load, the voice synthesizing server 20 can take over the processes to be performed by the client 10. Therefore, the data control unit 270 in the voice synthesizing server 20 instructs the data sending unit 110 to send data of lower level for the client 10.

For example, when the voice synthesizing server 20 is charged with a small load and has sufficient performance, the data control unit 270 in the voice synthesizing server 20 instructs the data control unit 130 in the client 10 to send text data even though the client 10 has the function of generating a pronunciation symbol.

The data control unit 270 in the voice synthesizing server 20 instructs the data control unit 130 in the client 10 to send a pronunciation symbol (or text data) even though the client 10 has the function of generating a pronunciation symbol and an acoustic parameter (with the above described configuration (iii).

As described above, when the voice synthesizing server 20 is charged with a small load, the load of the client 10 can be reduced by generating a pronunciation symbol of an acoustic parameter by the voice synthesizing server 20 on behalf of the client 10. At this time, the data sent by the client to the voice synthesizing server 20 are text data having data volume smaller than that of pronunciation symbols, or pronunciation symbols (or text data) having data volume smaller than that of acoustic parameters, thereby reducing the traffic of a LAN.

Furthermore, the client 10 according to the third principle of the present invention shown in FIG. 4 may includes a waveform generating unit 18.

When the client 10 issuing a request for synthesized voice includes the waveform generating unit 18, the data control unit 270 in the voice synthesizing server 20 instructs the data sending unit 260 to send either a voice waveform or an acoustic parameter to the client 10 according to the load of the voice synthesizing server 20 and the load of the LAN.

When the data receiving unit 120 receives an acoustic parameter, the data control unit 270 in the client 10 controls the data receiving unit 120 to output the acoustic parameter to the waveform generating unit 18. When it receives a synthesized voice waveform, the data control unit 270 controls it to output the voice waveform to the voice output unit 15.

For example, when the voice synthesizing server 20 is charged with a small load, the voice synthesizing server 20 performs all the processes required to generate a voice waveform, and the data sending unit 260 sends the voice waveform to the client 10.

When the voice synthesizing server 20 is charged with a large load, it sends an acoustic parameter to the client 10 without generating a voice waveform by the waveform generating unit 24. If there is heavy traffic in a LAN, an acoustic parameter, which has data volume smaller than that of a voice waveform is sent.

Thus, selecting a voice waveform or an acoustic parameter and sending it to the client 10 according to the loads of the voice synthesizing server 20, the LAN, and the client 10 improves the efficiency of the speech synthesis system. Furthermore, sending an acoustic parameter, which has data volume smaller than that of a voice waveform also reduces the load of the LAN.

Figure 5:
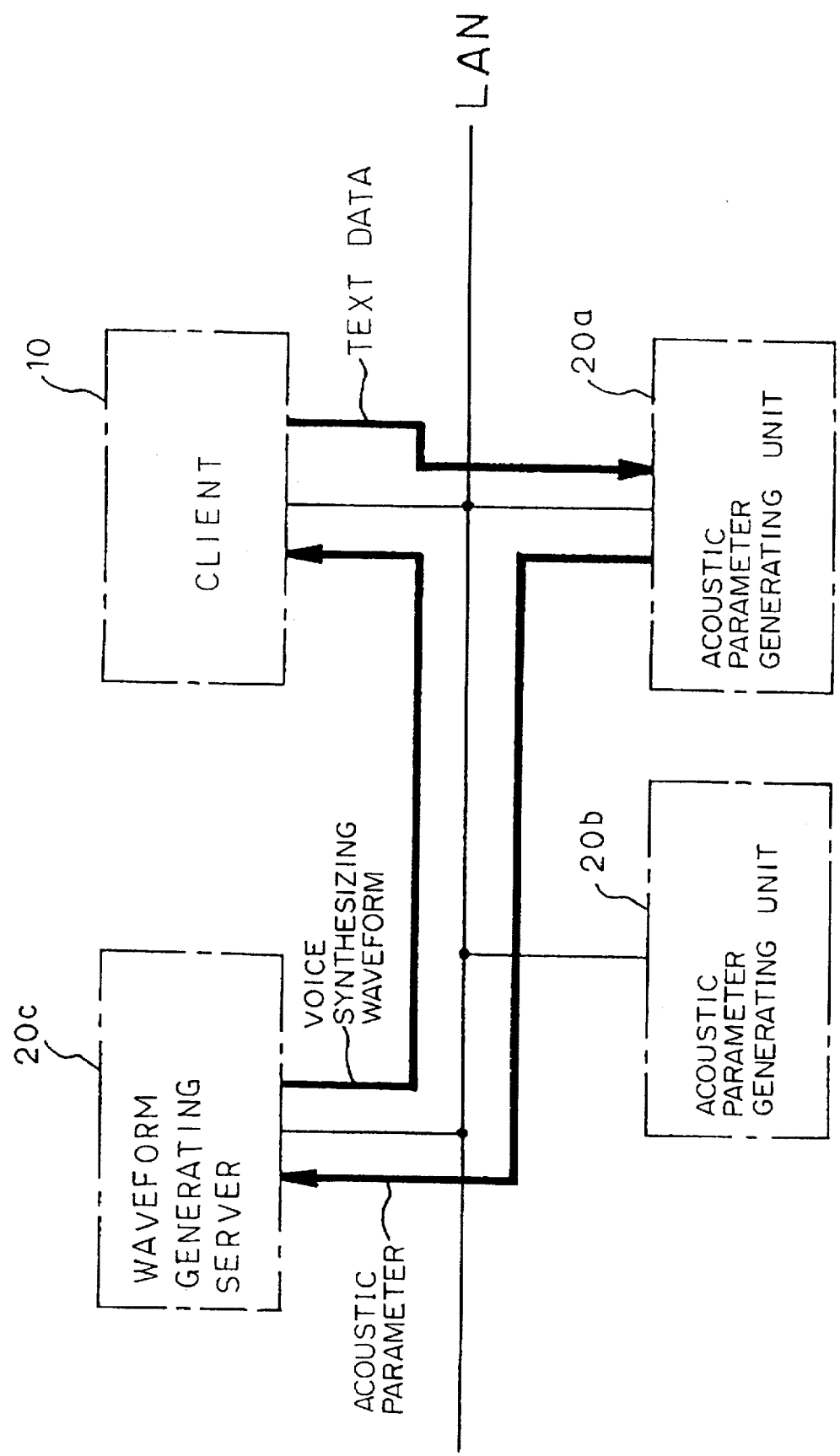
FIG. 5 shows the fourth principle of the present invention.

According to the fourth principle of the present invention shown in FIG. 5, acoustic parameter generating servers 20a and 20b are individually specialized in voice quality or in language, and generate an acoustic parameter for specific voice quality or languages.

The client 10 instructs the acoustic parameter generating servers 20a and 20b to generate an acoustic parameter, for specific voice quality or language.

Waveform server 20c synthesizes a voice waveform according to the acoustic parameter generated by the above described acoustic parameter generating servers 20a and 20b.

According to the fifth principle of the present invention shown in FIG. 5, when the client 10 instructs generation of an acoustic parameter of specific voice quality or a language, the corresponding acoustic parameter server 20a (or 20b) generates an acoustic parameter according to the text data sent from the client 10, and sends the acoustic parameter to waveform generating server 20c. Waveform generating server 20c generates a voice waveform according to the received acoustic parameter, and sends the voice waveform to the client 10. Thus, the client 10 outputs the text data vocally in the specified voice quality or language.

Figure 6:
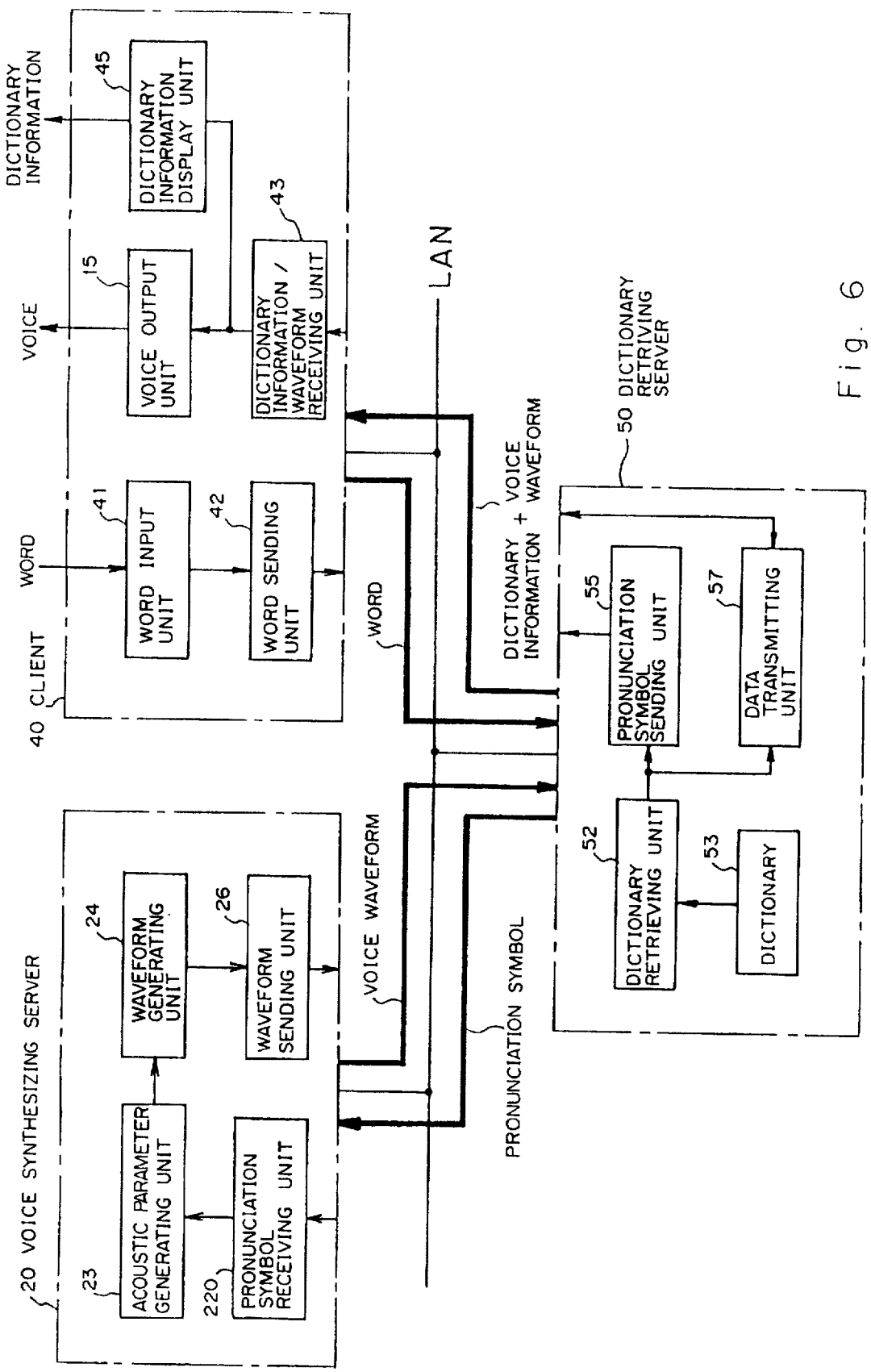
FIG. 6 shows the fifth principle of the present invention.

In FIG. 6, a dictionary retrieving client 40 includes a word input unit 41, a word sending unit 42, a dictionary information waveform receiving unit 43, the voice output unit 15, and a dictionary information display unit 45.

The word input unit 41 receives a word to be retrieved, and the word sending unit 42 sends the inputted word to the dictionary retrieving server 50.

The dictionary information/waveform receiving unit 43 receives dictionary information and the voice waveform of a word. The dictionary information display unit 45 displays the dictionary information of the word received by the dictionary information/waveform receiving unit 43, and the voice output unit 15 outputs the received voice waveform as voice.

The dictionary retrieving server 50 comprises a word dictionary 53, a dictionary retrieving unit 52, a pronunciation symbol sending unit 55, and a data transmitting unit 57.

The dictionary retrieving unit 52 searches the word dictionary 53 for the dictionary information of the word specified by the dictionary retrieving client 40 for retrieval.

The pronunciation symbol sending unit 55 sends, to the voice synthesizing server 20, the pronunciation symbol in the dictionary information retrieved by the dictionary retrieving unit 52.

The data transmitting unit 57 receives the voice waveform received from the voice synthesizing server 20, and sends, to the dictionary retrieving client 40, the received voice waveform and the dictionary information retrieved by the dictionary retrieving unit 52.

The voice synthesizing server 20 includes a pronunciation symbol receiving unit 220, the acoustic parameter generating unit 23, the waveform generating unit 24, and the waveform sending unit 26.

The pronunciation symbol receiving unit 220 receives a pronunciation symbol sent from the dictionary retrieving server 50. The waveform generating unit 24 generates a voice waveform corresponding to the received pronunciation symbol, and the waveform sending unit 26 sends the generated voice waveform to the dictionary retrieving server 50.

According to the fifth principle of the present invention shown in FIG. 6, the dictionary retrieving unit 52 retrieves, from the word dictionary 53, the dictionary information of the word specified by the dictionary retrieving client 40 for retrieval, and sends the pronunciation symbol in the retrieved dictionary information to the voice synthesizing server 20. The voice synthesizing server 20 generates a voice waveform corresponding to the pronunciation symbol, and sends the generated voice waveform to the dictionary retrieving server 50.

The dictionary retrieving server 50 sends, to the dictionary retrieving client 40, the dictionary information of the word retrieved by the dictionary retrieving unit 52 and the voice waveform received from the voice synthesizing server 20.

The dictionary retrieving client 40 displays the dictionary information of a word on the dictionary information display unit 45, and vocally outputs the pronunciation of a word from the voice output unit 15.

Thus, when a user issues a request for retrieval of a specific word, the meaning of the word is displayed and its pronunciation is vocally outputted. Therefore, the user can be informed of the meaning and the pronunciation of the word simultaneously.

Figure 7:
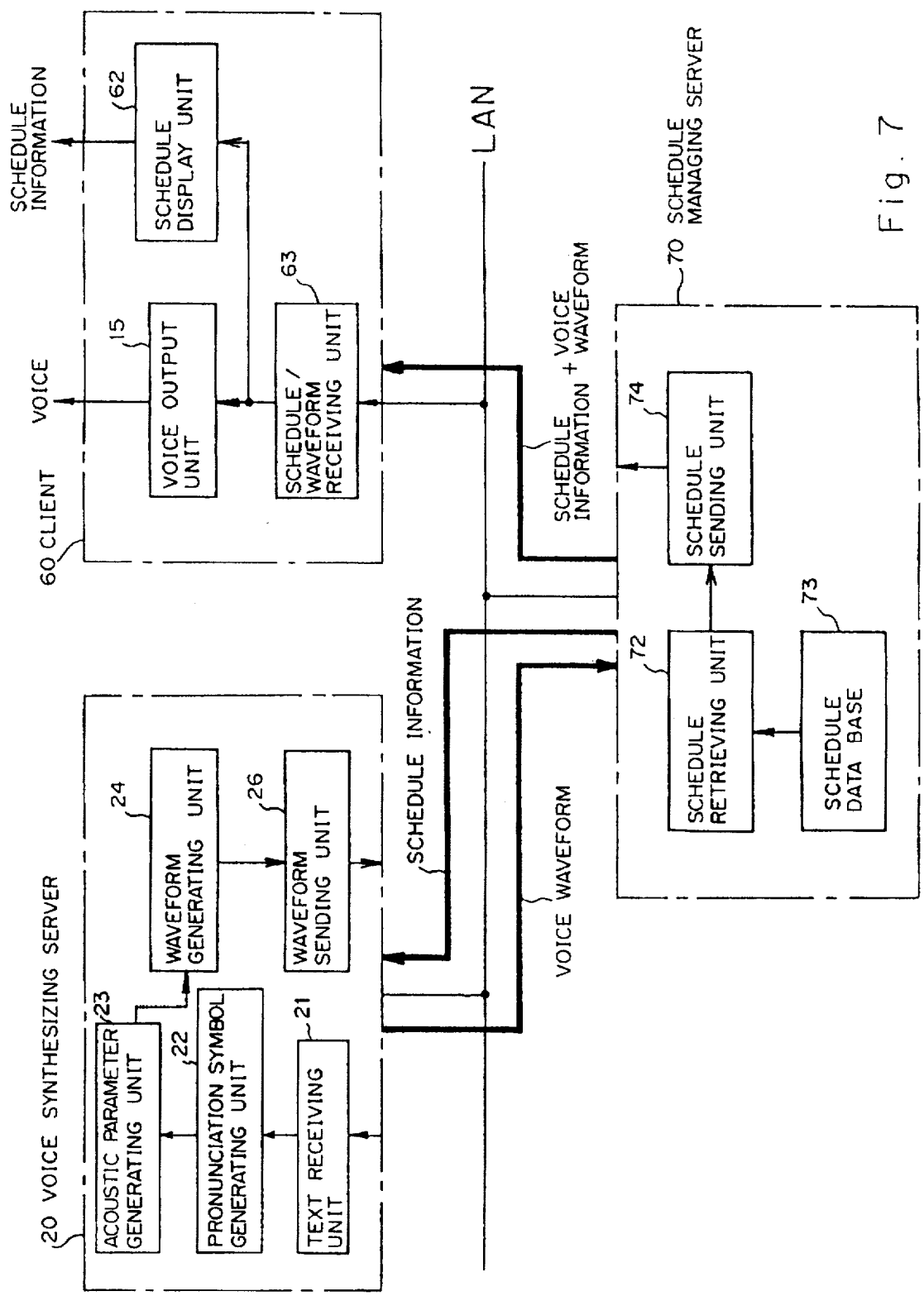
FIG. 7 shows the sixth principle of the present invention.

Next, in the sixth principle of the present invention shown in FIG. 7, a schedule managing client 60 comprises a schedule/waveform receiving unit 63, a voice output unit 15, and a schedule display unit 62.

The schedule/waveform receiving unit 63 receives schedule information and a voice waveform. The schedule display unit 62 displays the schedule information received by the schedule/waveform receiving unit 63, and the voice output unit 15 outputs the received voice waveform as voice.

A schedule managing server 70 includes a schedule data base 73, a schedule retrieving unit 72, and a schedule sending unit 74.

The schedule data base 73 stores schedule information of a plurality of users, and the schedule retrieving unit 72 retrieves, from the schedule data base 73, the schedule information on a predetermined condition. The schedule sending unit 74 sends the retrieved schedule information to the voice synthesizing server 20.

The voice synthesizing server 20 includes the text receiving unit 21, the pronunciation symbol generating unit 22, the acoustic parameter generating unit 23, the waveform generating unit 24, and the waveform sending unit 26.

The text receiving unit 21 receives the schedule information sent from the schedule managing server 70. The waveform generating unit 24 generates a voice waveform corresponding to the received schedule information, and the waveform sending unit 26 sends the voice waveform to the schedule managing server 70 or to the schedule managing client 60.

According to the sixth principle of the present invention shown in FIG. 7, the schedule managing server 70 retrieves schedule information stored in the schedule data base 73, and retrieves, for example, the schedule information for the present time. Then, the schedule information is sent to the voice synthesizing server 20. The voice synthesizing server 20 generates a voice waveform corresponding to the schedule information received in text data format, and sends the voice waveform to the schedule managing server 70.

The schedule managing server 70 sends, to the schedule managing client 60, the voice waveform together with the schedule information. The schedule managing client 60 displays the received schedule information on the schedule information display unit 62, and outputs, from the voice output unit 15, the voice informing of the content of the schedule.

Thus, the schedule information is displayed on a display unit, etc. and vocally outputted, thereby informing the user of the schedule without fail.

In FIG. 7, a voice waveform generated by the voice synthesizing server 20 is sent to the schedule managing client 60 through the schedule managing server 70. Also, it can be directly sent to the schedule managing client 60.

Figure 8:
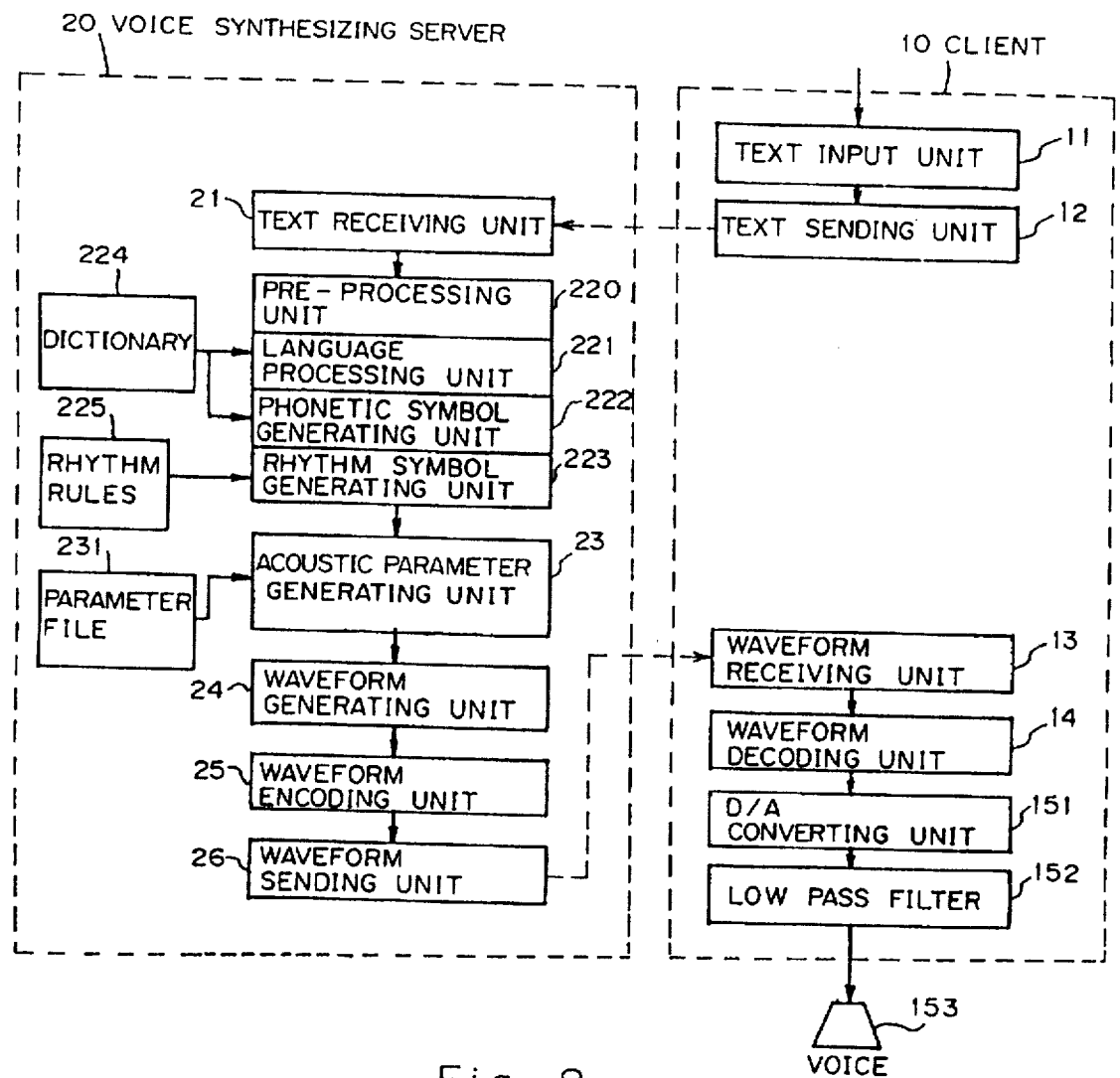
FIG. 8 shows embodiment 1 of the present invention.

FIG. 8 shows the configuration of the speech synthesis system of embodiment 1 of the present invention. The embodiment shows the case in which at least one voice synthesizing server 20 and a plurality of clients 10 are connected to a LAN.

The client 10 includes the text input unit 11 for receiving as text data a message to be processed to synthesize voice, the text sending unit 12 for sending to the voice synthesizing server 20 the text data inputted to the text input unit 11, the waveform receiving unit 13 for receiving an encoded voice waveform sent from the voice synthesizing server 20, the waveform decoding unit 14 for decoding the received voice waveform, a D/A converting unit 151 for converting the decoded voice digital data to analog data, and a low-pass filter 152 for removing high frequency components from the analog data. A speaker 153 is connected to the low-pass filter 152.

The voice synthesizing server 20 includes the text receiving unit 21 for receiving text data received from the text sending unit 12 in the client 10, a pre-processing unit 220 for determining how to read abbreviations or numbers in the received text data, a language processing unit 221 for referring to the information in a dictionary 224 to morpheme-analyze and syntax-analyze the information, and a phonetic symbol generating unit 222 for converting the analysis result to phonetic symbol strings indicating how to pronounce the text data.

The voice synthesizing server 20 further includes a prosodic symbol generating unit 223 for referring to rhythm rules 225 and generating a prosodic symbol indicating intonation and accent according to the result received from the language processing unit 221 and the phonetic symbol generating unit 222, the acoustic parameter generating unit 23 for referring to a parameter file 231 for storing acoustic parameters to generate voice-parameters-in-time-series according to the phonetic symbol strings and the prosodic symbol strings.

The voice synthesizing server 20 further includes the waveform generating unit 24 for generating a voice waveform according to the voice-parameters-in-time-series, the waveform encoding unit 25 for encoding the generated voice waveform, and the waveform sending unit 26 for sending the encoded voice waveform.

Each part in the configuration is described below in detail.
<Pre-processing unit>

The pre-processing unit 220 determines how to read abbreviations and numbers in text data. When an abbreviation, a symbol, or numbers are found in text data, the pre-processing unit 220 extracts them and determines how to read the extracted items by referring to the correspondence table shown in FIG. 9.
<Language processing unit>

The language processing unit 221 refers to information in the dictionary 224, and morpheme- and syntax-analyzes inputted text data. A "morpheme analysis" is a process of dividing inputted text data into the minimum units forming part of the text data and yet having a meaning (that is, morphemes) and determining the part-of-speech, the reading, and the accent of the text data. A "syntax analysis" is a process of analyzing a unit which has a grammatic meaning according to a moto assign lysis result so as to assign natural intonation to the inputted text data.

The phonetic symbol generating unit 222 converts text data to phonetic symbol strings indicating how the text data are pronounced. A "phonetic symbol string" is a symbol string representing the pronunciation of a word, and one string corresponds to one Japanese character or to a character as a phonetic symbol divided depending on the position of the character in the text data.
<Prosodic symbol generating unit>

The prosodic symbol generating unit 223 generates a prosodic symbol indicating intonation and accentuation of text data by referring to the rhythm rules 225 and according to analysis results from the language processing unit 221 and phonetic symbols generated by the phonetic symbol generating unit 222.

The rhythm rules 225 are the rules for applying according, to the syntax information obtained from the language processing unit 221, a pause symbol at a semantic delimitation and a symbol for controlling a second rise in intonation. Additionally, the rules regulate the changes in the accent position caused by the combination of a word and an auxiliary word, and the combination of words. Pronunciation symbols consist of phonetic symbols and prosodic symbols.

Next, the acoustic parameter generating unit 23 refers to the parameter file 231 to generate voice-parameters-in-time-series according to phonetic symbol strings and prosodic symbol strings.

An acoustic parameter is obtained by compressing actual voice data to each composition unit (for example, a phonetic or a syllable). PARCOR (LPC), LSP, Formant, etc. are examples of acoustic parameters depending on each data compressing method (depending on each model of a voice synthesizing process).

For example, in the case of Formant (resonance frequency of a voice path), a digital filter obtained by modeling a voice path transmission function is configured by specifying a Formant frequency and a Formant band according to phonetic symbol strings, and is operated according to voice source signals generated by prosodic symbol strings. Thus, voice waveforms are generated.

The waveform generating unit 24 generates a voice waveform according to the voice-parameters-in-time-series, and the waveform encoding unit 25 compresses the data in the generated voice waveform. Encoding methods such as ADM, ADPCM, APC, SBC, ATC, PARCORM MPC, VQ, etc. are used as methods of compressing data.

Figure 10:
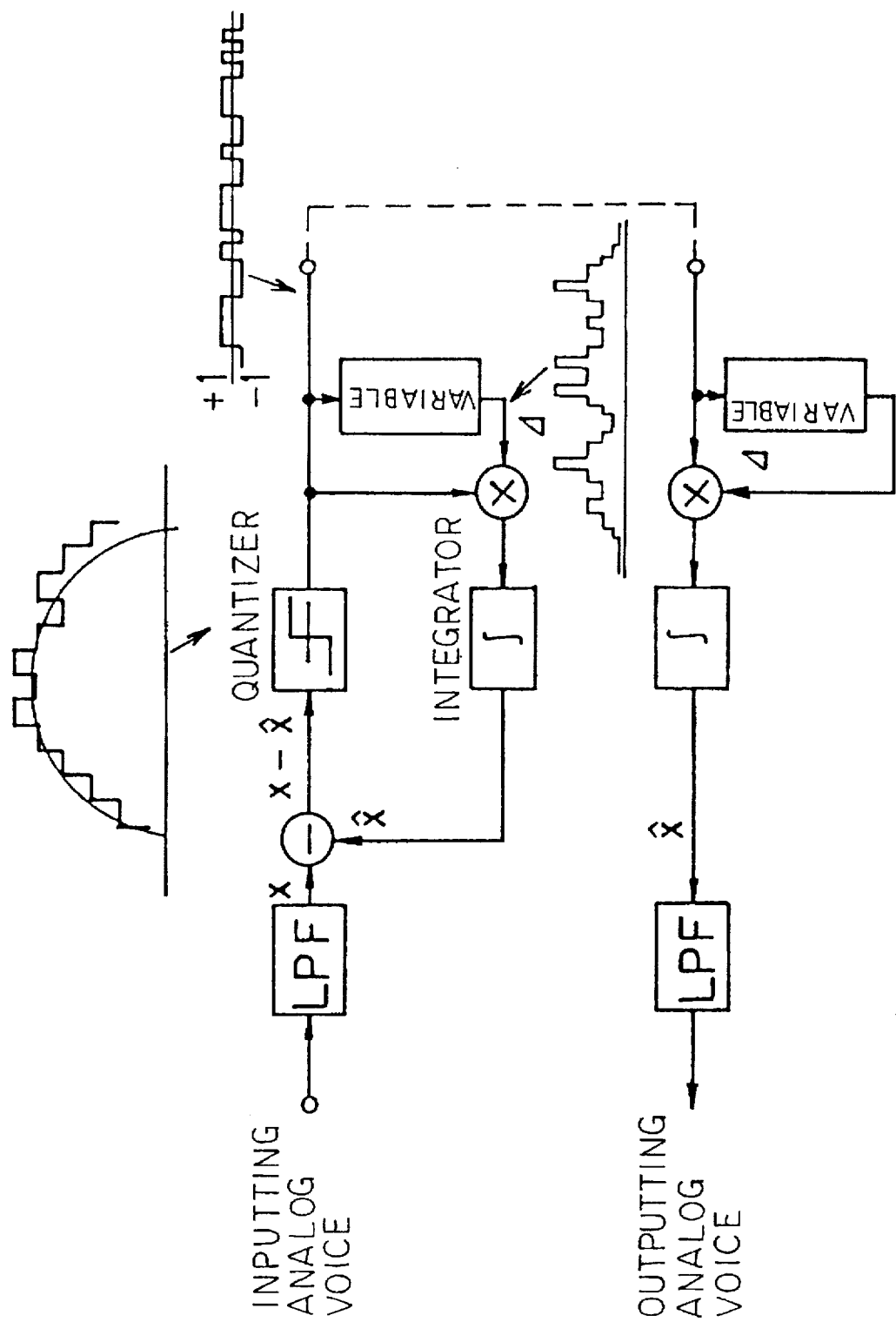
FIG. 10 is a block diagram of an ADM.

The above described data compressing methods used by the acoustic parameter generating unit 23 and the waveform generating unit 24 are explained below. "ADM" is an abbreviation for "adaptive delta modulation". It is the easiest method of obtaining a prediction code in which the difference between an input signal and a prediction value is encoded by 1 bit (1 level each for a positive and a negative difference). Since ADM is allowed only two quantization levels per sample value, the difference is encoded with the difference between adjacent samples minimized by using a high sampling frequency of an input signal. To execute an adaptive quantization, the step size must be small in the range where the amplitude of the difference indicates a small variation, while it must be large in the range where the amplitude indicates a large variation. FIG. 10 shows the configuration of the ADM encoding method.

Figure 11:
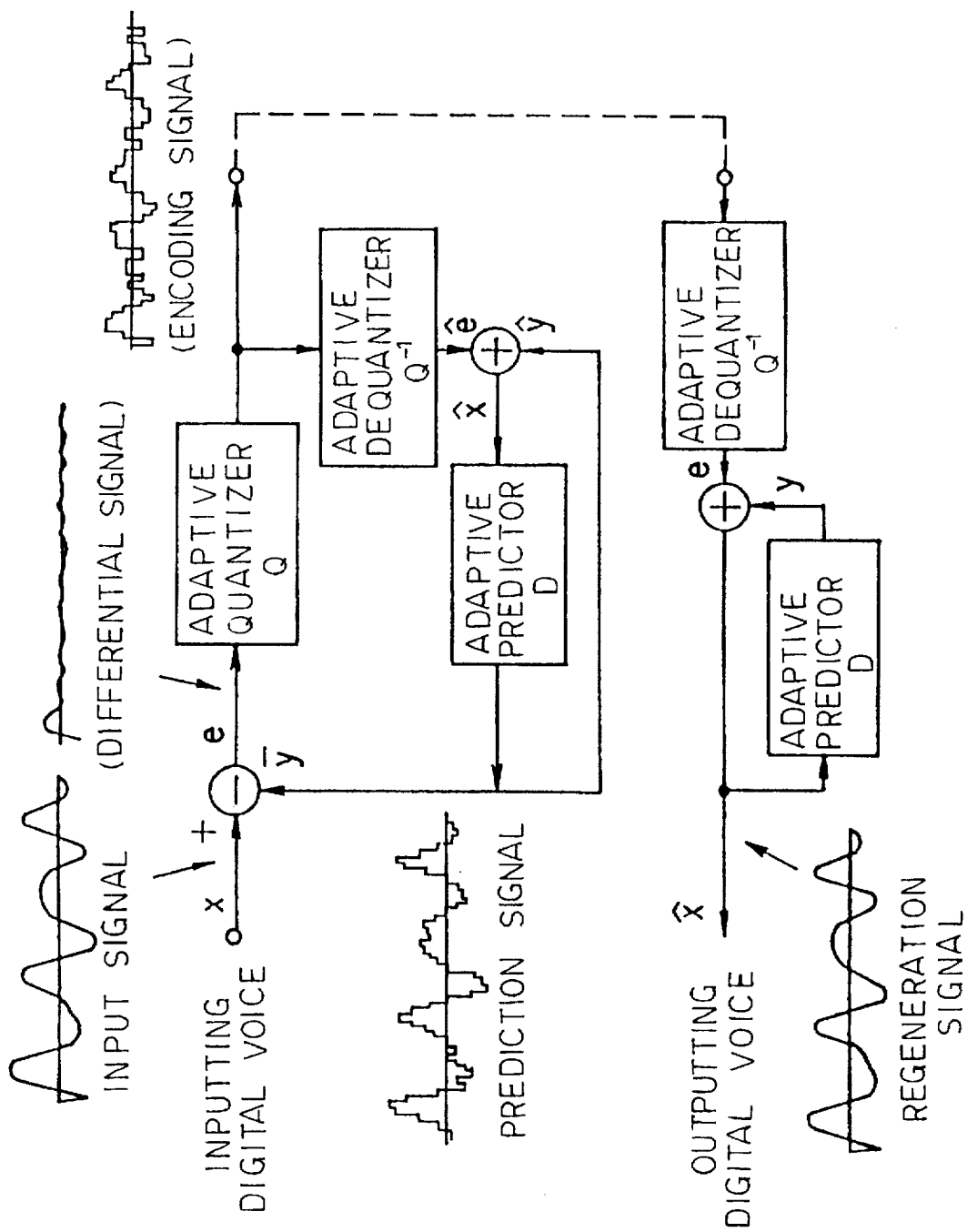
FIG. 11 is a block diagram of an ADPCM.

"ADPCM" is an abbreviation for "adaptive differential pulse code modulation". In ADPCM, the present input signal is predicted through the past input signal, and the difference between the past and the present input signals is quantized and encoded. Since a great change in the level of an input signal causes a large quantization noise, adaptive quantization is executed by controlling the quantization step size. The prediction method can be either a fixed prediction method in which a prediction unit has a fixed prediction coefficient, or an adaptive prediction method in which a prediction coefficient is determined such that a predicted error between the present and the past input signals can be minimized. The adaptive prediction method requires an algorithm more complicated than that of the fixed prediction method. However, the latter provides higher quality encoding characteristics than those of the former. FIG. 11 shows the configuration of the ADPCM encoding method.

Figure 12:
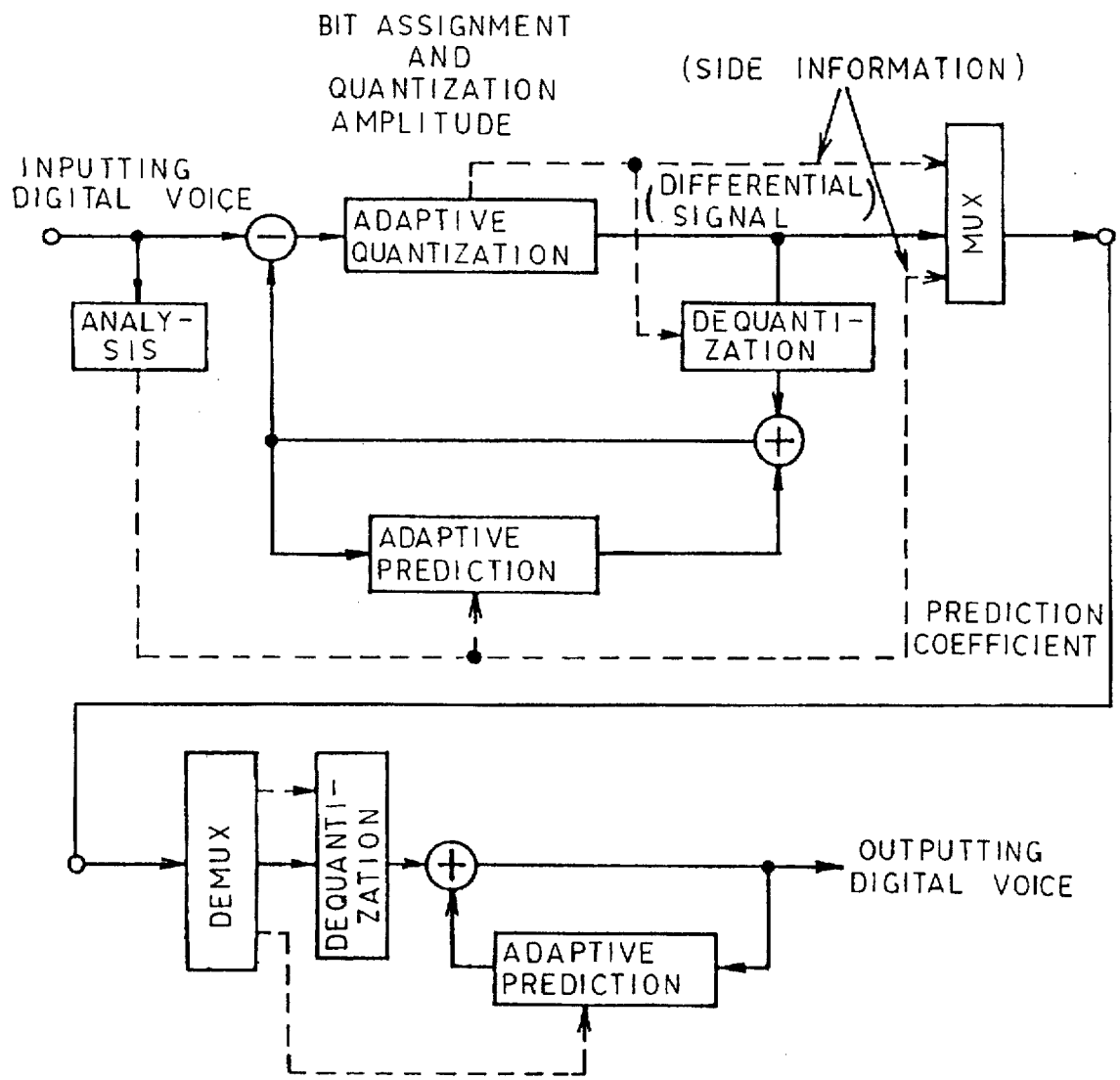
FIG. 12 is a block diagram of an APC.

"APC" is an abbreviation for "adaptive predictive coding" in which a prediction coefficient is obtained by receiving an input signal in block units and analyzing it by a linear prediction. A prediction signal is generated according to the prediction coefficient, the difference between the prediction signal and the input signal is quantized and encoded, and the prediction coefficient and the quantization step size are transmitted as additional information. Unlike ADM and ADPCM in which data are predicted serially, the APC encoding method performs linear prediction by obtaining an optimum prediction coefficient for a sample of the whole block. Therefore, it obtains a large value of prediction gain, and the encoding quality is greatly improved. FIG. 12 shows the configuration of APC.

Figure 13:
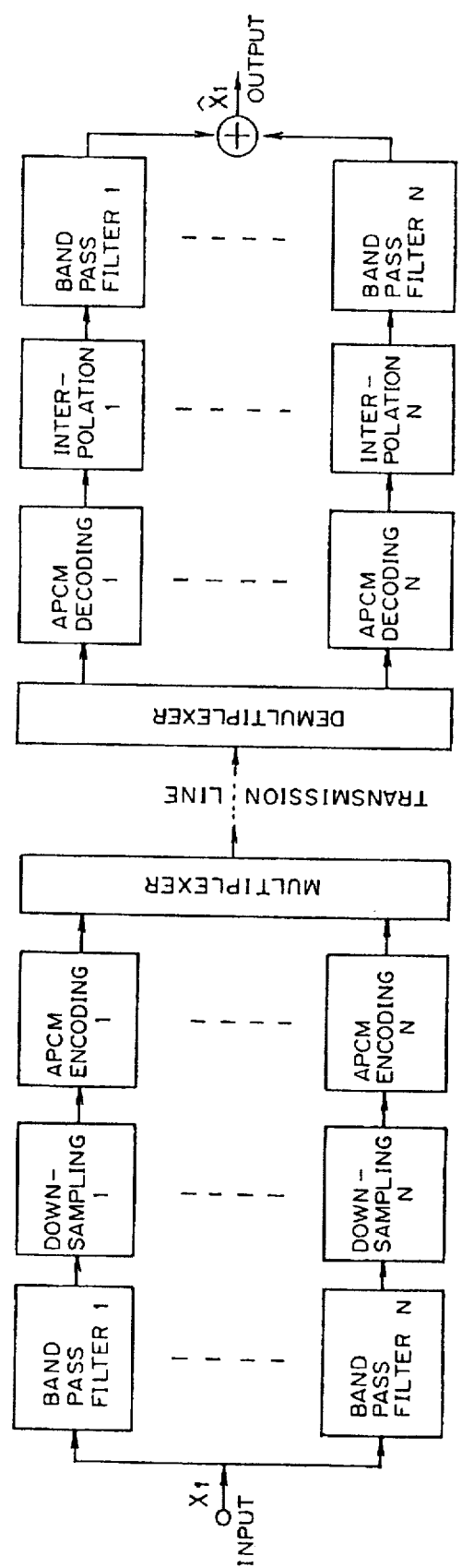
FIG. 13 is a block diagram of an SBC.

"SBC" is an abbreviation for "sub-band coding" in which a voice signal is divided into a plurality of frequency bands, each of the band signals is downsampled at the Nyquist speed and converted to a base band signal, and then it is encoded by the ADPCM, etc. FIG. 13 shows the configuration of the SBC. In an encoding process performed on each band, the total voice quality can be improved by assigning a large number of quantization bits to a band where voice energies are concentrated. Furthermore, in this method, a quantization noise is generated in divided bands only, and hardly affects other bands. The SBC is performed by halving bands, and usually accompanied by a QMF (quadrature mirror filter) for canceling wrapping components.

Figure 14:
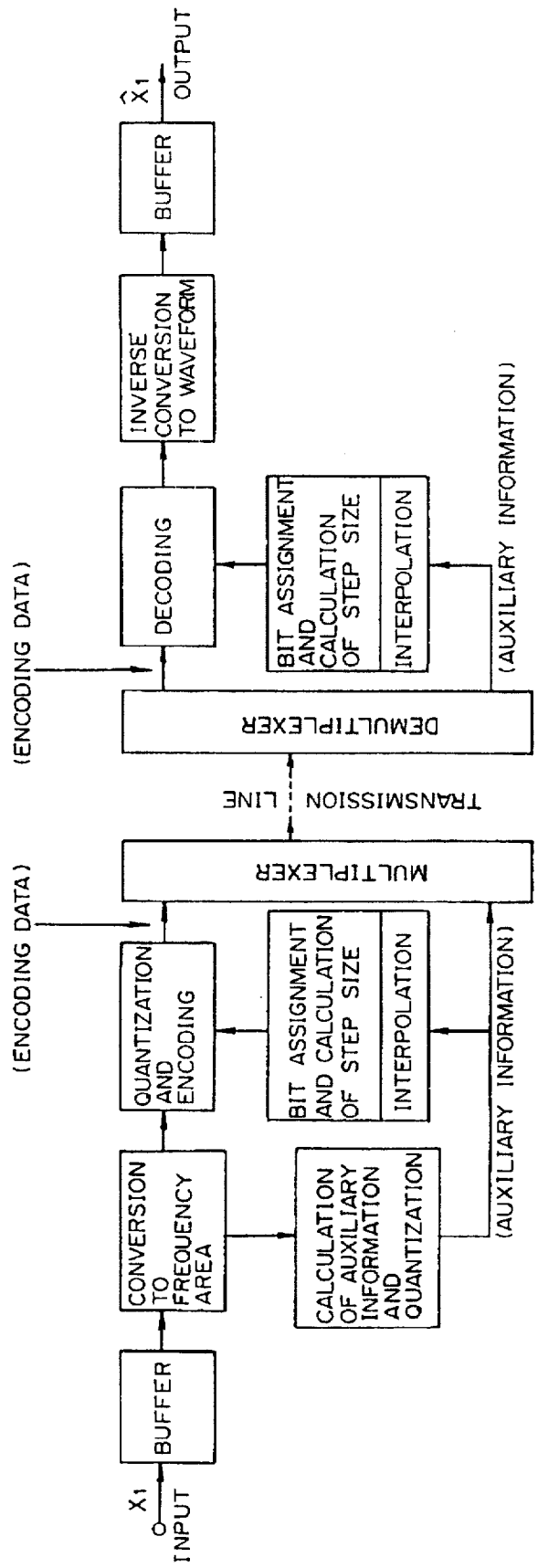
FIG. 14 is a block diagram of an ATC.

"ATC" is an abbreviation for "adaptive transform coding". In this method, approximately 20 ms at which voice is normally outputted is defined as one block (frame), and values obtained by orthogonally converting voice waveform signals in the block to the frequency domain are encoded. In a decoding process, voice waveform signals in one block are regenerated by performing inverse orthogonal transform on the values of the frequency area. The ATC method is normally carried out by adopting the discrete cosine transform (DCT) for orthogonal transformation to conduct adaptive bit assignment. By the ATC encoding method, the audition of human beings can be easily associated with a frequency analysis, and quantization noises can be easily controlled in the frequency domain. FIG. 14 shows the basic configuration.

Figure 15:
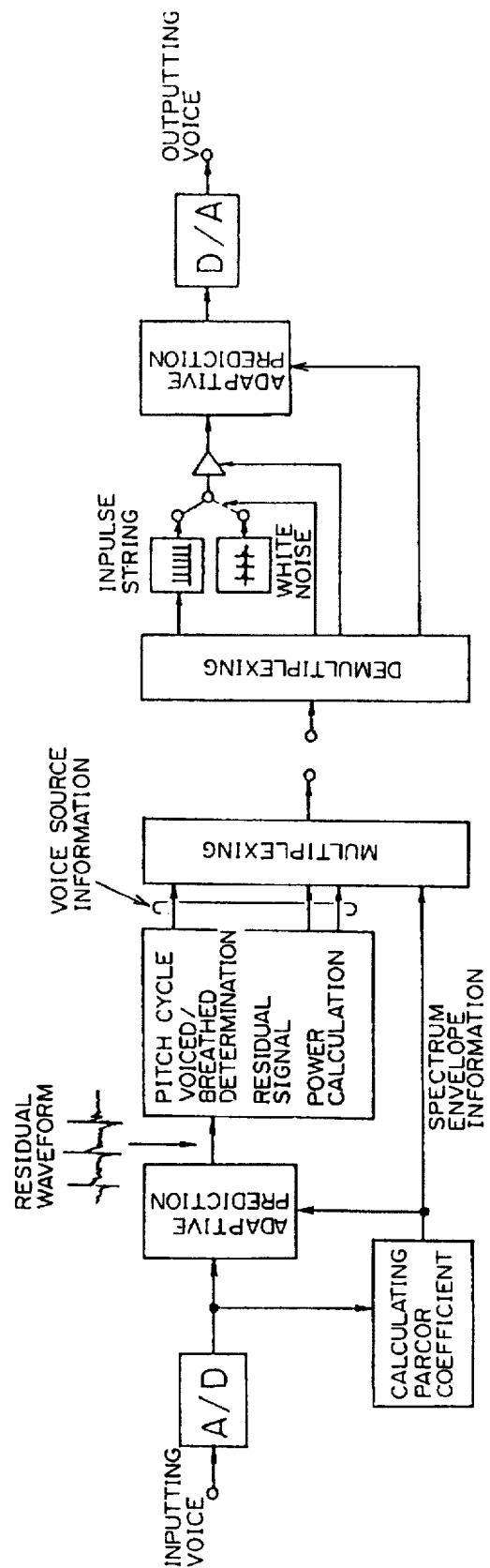
FIG. 15 is a block diagram of a PARCOR.

"PARCOR" is an abbreviation for "partial auto correlation". Human voice is generated by converting a voice source signal generated by the vibration of the vocal cords and a random breath flow, caused by controlling the opening of the mouth, to a voice signal having a specific spectrum distribution determined by the resonance of the voice path, mouth, and nose. Based on this, a voice analyzing and synthesizing method has been established by extracting (analyzing) generated voice source information and spectrum distribution information, and by restoring (synthesizing) a voice signal using these parameters. As shown in FIG. 15, voice can be synthesized by driving a prediction filter by a pulse generator for simulating the vibration of vocal cords if it is a voiced sound, and by a white noise generator for simulating a random breath flow signal if it is a breathed sound.

In this method, a PARCOR coefficient is used as spectrum information in place of a prediction coefficient. A PARCOR coefficient has an excellent transmission efficiency and secures the stability of a prediction filter against quantization error caused while parameters are encoded. Voice source information is extracted from the prediction residual signal obtained by applying a voice signal to an inverse filter (a filter having inverse characteristics to a prediction filter). Practically, the pulse cycle (pitch) is obtained from the sample interval having the maximum correlation coefficient of the residual signal. The voiced/breathed determination is made using the values of the correlation coefficient and the primary PARCOR coefficient. A PARCOR coefficient, pitch cycle, voiced/breathed sound determination, and residual power information are quantized and transmitted per frame cycle (approximately 20 ms) as encoded information.

An LSP method developed later uses an LSP (line spectrum pair) coefficient in place of a PARCOR coefficient, and is greatly improved in that voice spectrum information can be easily extracted and a high data compression rate can be obtained when the parameters are encoded.

Figure 16:
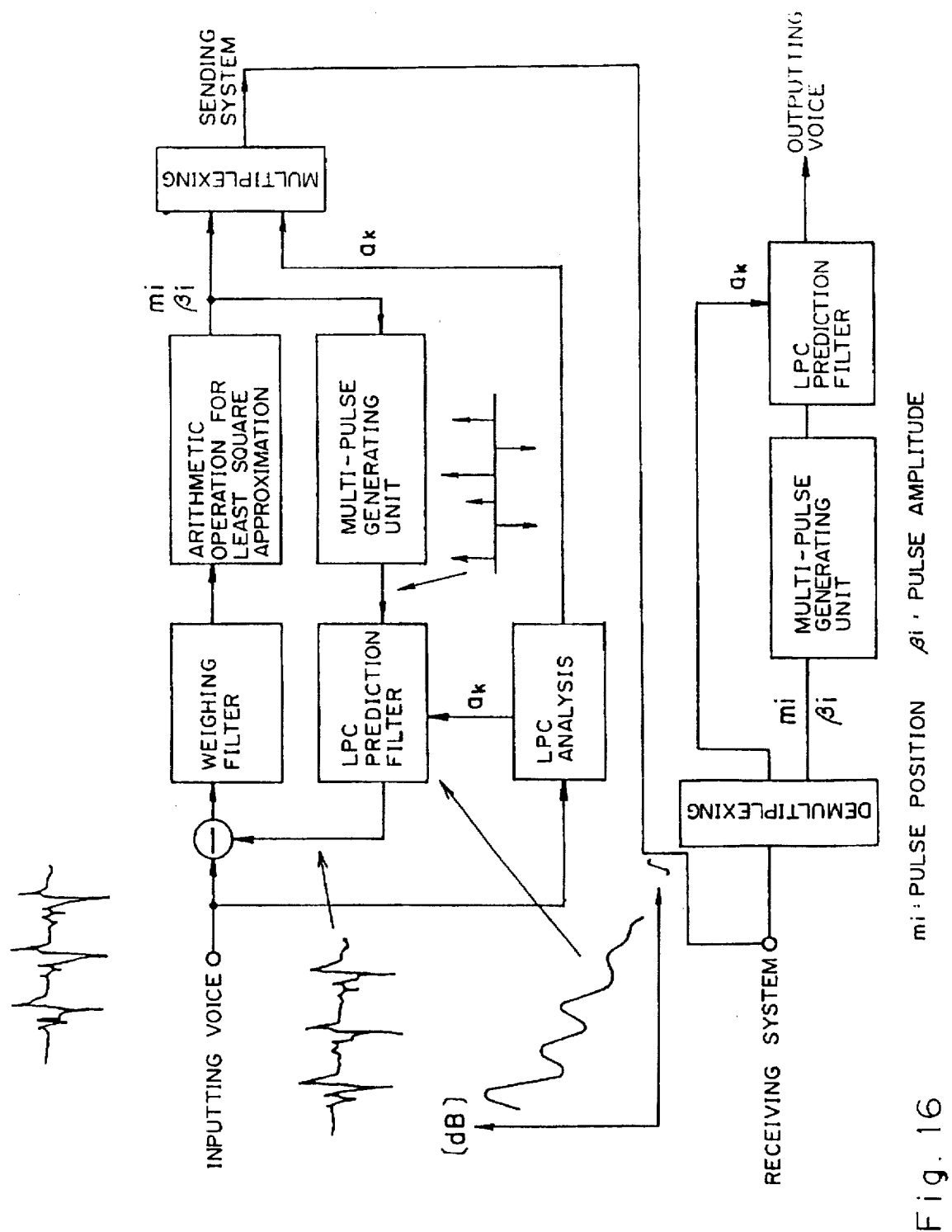
FIG. 16 is a block diagram of an MPC.

"MPC" is an abbreviation for "multi-pulse coding". In this method, with a linear prediction (LPC) analysis and synthesis system (VOCODER), a voice source is not modeled with pulses and noises, but is represented by a plurality of pulses regardless of whether it is a voiced or a breathed sound, and an LPC synthesizing filter is driven. The important point in encoding data by the MPC method is how the amplitudes of a plurality of pulses and the time positions are optimized. FIG. 16 shows the method based on the A-b-S (analysis-by-synthesis) principle. First, voice signals are retrieved as a block (frame) of about 20 ms in length, and a spectrum envelope is estimated according to the linear prediction analysis for the block. Next, multiple pulses of a voice source for the voice signals in the frame are determined. Practically, if the number of pulses is determined, the multiple pulses are converted to synthesized voice through an LPC synthesizing filter for the estimated spectrum envelope. The error between the synthesized voice and the actual original voice signal is calculated and weighed through audition characteristics. Then, the new amplitudes and time positions of the pulses are determined such that the average squared error can be minimized.

Figure 17:
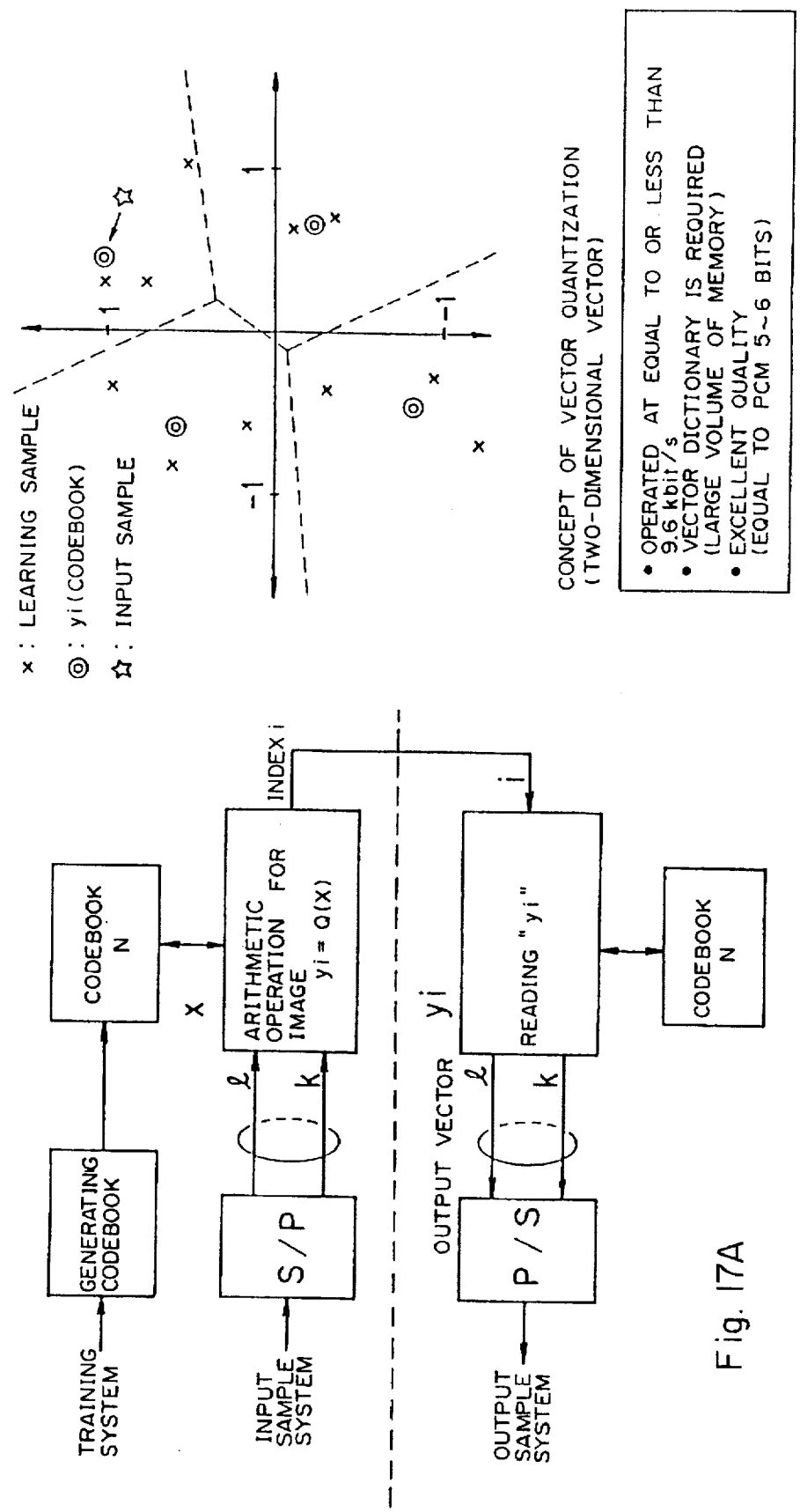
FIG. 17A is a block diagram of a VQ.
FIG. 17B is a diagram of a waveform pattern.

"VQ" is an abbreviation for "vector qantization". It is a quantizing method for representing a group of values (vector) by one symbol without quantizing a waveform or a spectrum envelope parameter for each sample value using a waveform encoding system and an analysis synthesis system. At first, the vector quantizing method was suggested as a highly efficient method of quantizing LPC parameters. Then, it was applied to the quantization of waveforms. In the encoding process by vector quantization shown in FIG. 17, sampled waveforms are retrieved in a certain time frame, and the waveform pattern in the frame is represented by one symbol. Therefore, various waveform patterns are prepared by a lustering method and assigned symbols. A codebook has a correspondence table of symbols and patterns. An inputted pattern is compared with each pattern in the codebook for a certain time period (pattern-matching). Then, the symbol of the waveform having the highest similarity represents the waveform of the time period.

Next, in FIG. 8, the voice synthesizing process of embodiment 1 is explained below. When text data are inputted by a user from the text input unit 11 in the client 10, the inputted text data are sent from the text sending unit 12 to the voice synthesizing server 20.

In the voice synthesizing server 20, the text receiving unit 21 receives the text data and the pre-processing unit 220 determines how to read the abbreviations or numbers in the text data. Then, the language processing unit 221 refers to the information in the dictionary 224 to analyze the morphemes and the syntax of the text data. The phonetic symbol generating unit 222 converts the text data to phonetic symbol strings indicating how they are pronounced. The prosodic symbol generating unit 223 generates prosodic symbol strings indicating intonation and accent of the text data according to the results obtained by the language processing unit 221 and the phonetic symbol generating unit 222.

Next, the acoustic parameter generating unit 23 refers to the parameter file 231 to generate voice-parameters-in-time-series according to the pronunciation symbol strings and the prosodic symbol strings. The waveform generating unit 24 generates voice waveforms according to the acoustic parameters-in-time-series. The waveform encoding unit 25 compresses the data in the generated voice waveforms. The waveform sending unit 26 sends the compressed data of the synthesized waveform to the waveform receiving unit 13 in the client 10.

In the client 10, the waveform receiving unit 13 receives the compressed data of the waveforms from the server 2, and the waveform decoding unit 14 decodes the encoded voice waveforms. The D/A converting unit 151 converts digital voice waveforms to analog voice waveforms. Then, the analog voice waveforms are outputted from the speaker 152 through the low-pass filter 152.

<Embodiments 2 and 3>

Figure 18:
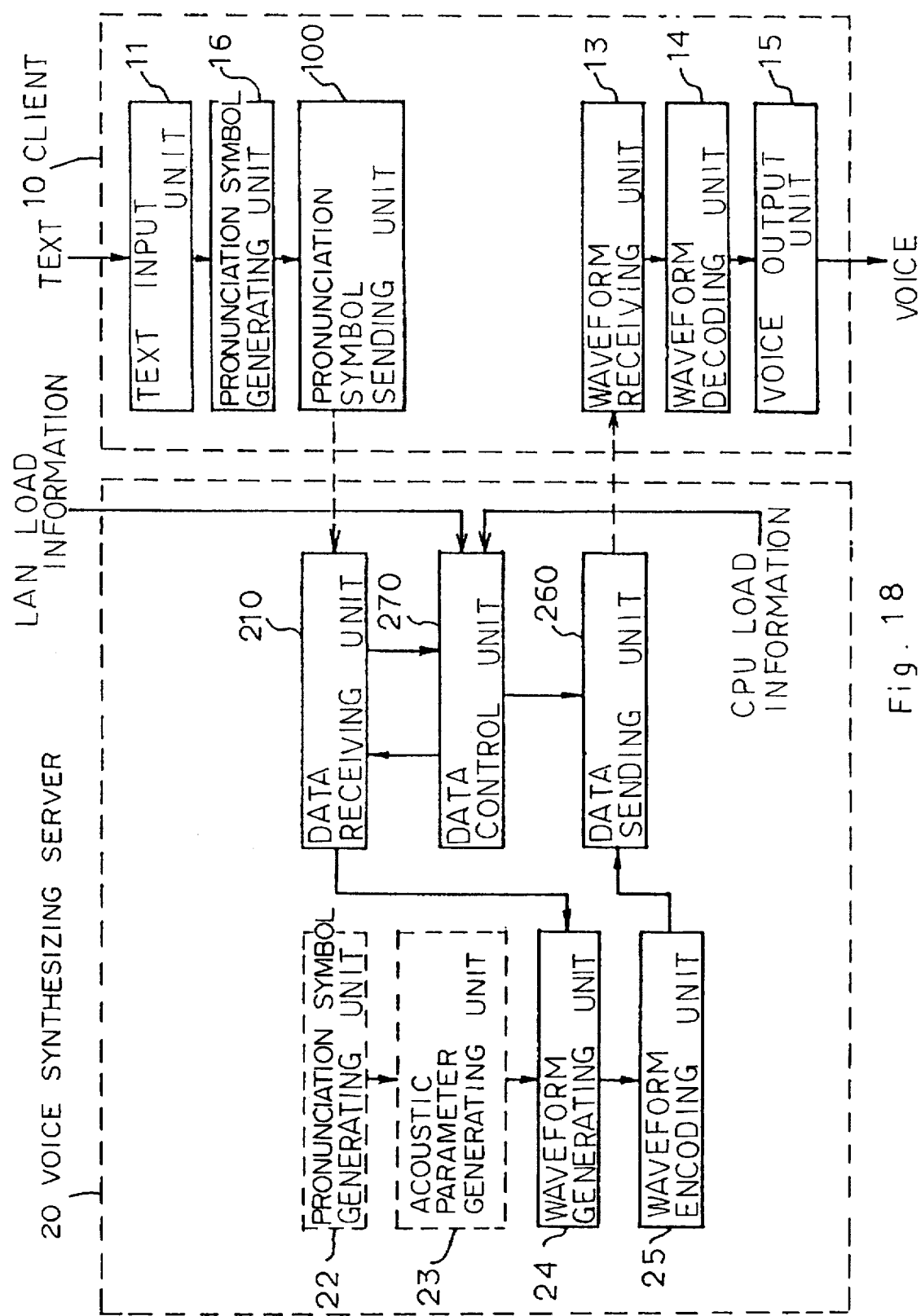
FIG. 18 shows embodiment 2 of the present invention.
Figure 19:
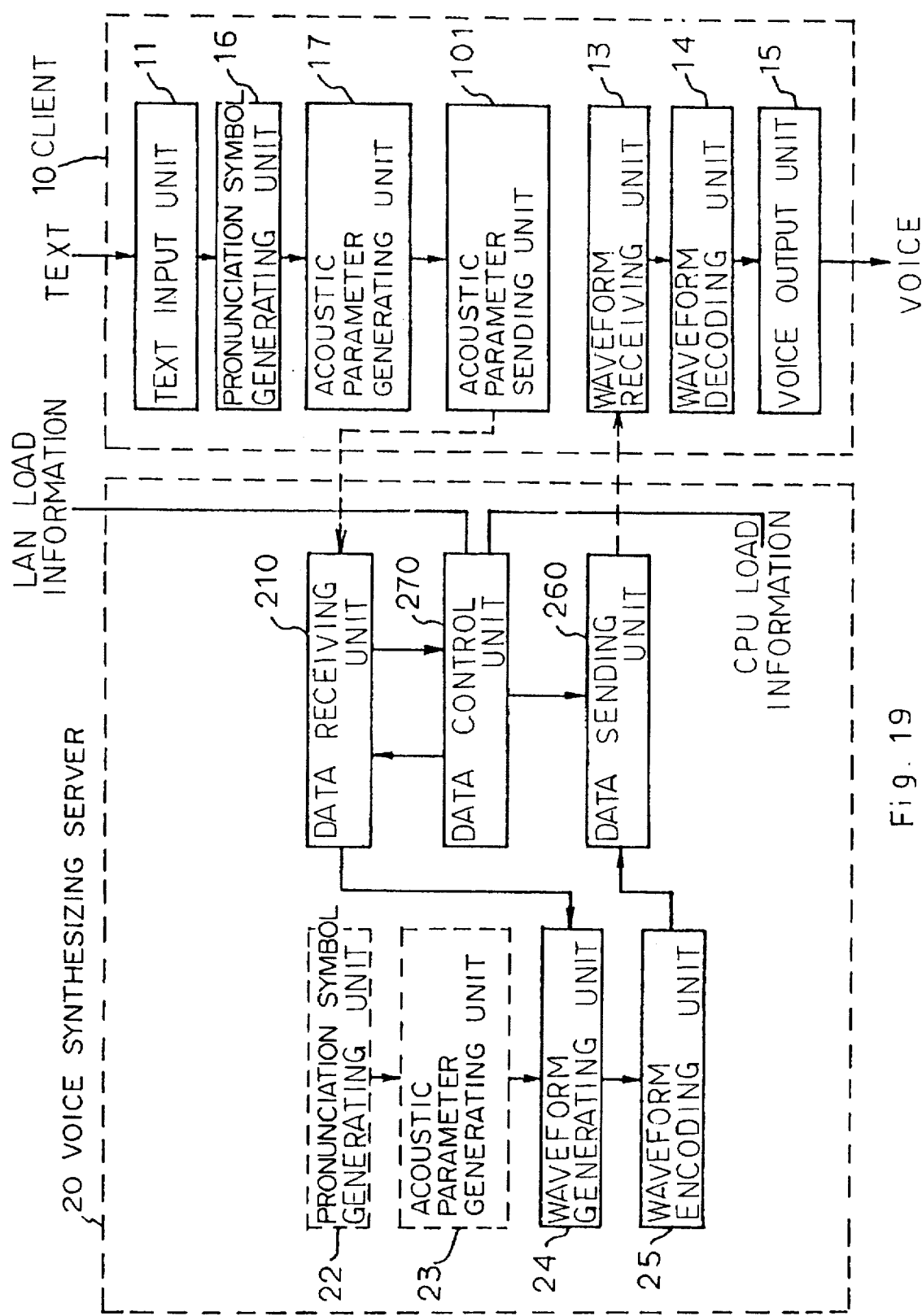
FIG. 19 shows embodiment 3 of the present invention.

FIG. 18 shows the configuration of the system in embodiment 2 of the present invention in which the client 10 has the function of generating pronunciation symbols. FIG. 19 shows the configuration of the system in embodiment 3 of the present invention in which the client 10 has the function of generating acoustic parameters.

The client 10 in embodiment 2 shown in FIG. 18 includes the text input unit 11, the pronunciation symbol generating unit 16, the pronunciation symbol sending unit 100 as the data sending unit 110, the waveform receiving unit 13 as the data receiving unit 120, the waveform decoding unit 14, and the voice output unit 15.

The client 10 in embodiment 3 shown in FIG. 19 includes the text input unit 11, the pronunciation symbol generating unit 16, the acoustic parameter generating unit 17, the acoustic parameter sending unit 101 as the data sending unit 110, the waveform receiving unit 13 as the data receiving unit 120, the waveform decoding unit 14, and the voice output unit 15.

In each embodiment, the voice synthesizing server 20 includes the data receiving unit 210, the pronunciation symbol generating unit 22, the acoustic parameter generating unit 23, the waveform generating unit 24, the waveform encoding unit 25, the data sending unit 260, and the data control unit 270.

The data control unit 270 in the voice synthesizing server 20 determines the type of data received by the data receiving unit 210, and controls the data receiving unit 210 and the data sending unit 260 according to the LAN load information (traffic information) and its own CPU load information. The data control unit 270 informs the data control unit in the client 10 (not shown in the figures) of the type of data to be sent.

That is, the data control unit 270 determines the type of data received by the data receiving unit 210, and outputs them selectively to the pronunciation symbol generating unit 22, the acoustic parameter generating unit 23, or the waveform generating unit 24.

The operations according to embodiments 2 and 3 are described below.

In FIG. 18, when a user inputs text data to the text input unit 11 in the client 10, the pronunciation symbol generating unit 16 converts them to pronunciation symbol strings indicating how to pronounce the text data. Then, the pronunciation symbol sending unit 100 sends the pronunciation symbol strings to the voice synthesizing server 20.

When the data receiving unit 210 in the voice synthesizing server 20 receives data (pronunciation symbol strings) from the client 10, the data control unit 270 determines the type of the data received by the data receiving unit 210, and controls so as to output the data to the corresponding circuit. At this time, the client 10 sends pronunciation symbol strings as transmission data, and the data control unit 270 outputs the pronunciation symbol strings to the acoustic parameter generating unit 23.

The phonetic parameter generating unit 23 converts the pronunciation symbol strings received by the data receiving unit 210 to voice-parameters-in-time-series, and the waveform generating unit 24 generates voice waveforms according to the acoustic parameter-in-time-series. Then, the waveform encoding unit 25 encodes and compresses the data of the generated voice waveforms, and the data sending unit 26 sends the encoded voice waveform to the client 10.

The waveform receiving unit 13 in the client 10 receives the encoded voice waveform from the voice synthesizing server 20, and the waveform decoding unit 14 decodes the encoded voice waveforms. Then, the voice output unit 15 outputs the result as voice.

<Embodiment 3>

In FIG. 19, when a user inputs text data to the text input unit 11 in the client 10, the pronunciation symbol generating unit 16 converts the data to pronunciation symbol strings indicating how the text data are pronounced. Then, the acoustic parameter generating unit 17 converts the pronunciation symbol strings to voice-parameters-in-time-series, and the acoustic parameter sending unit 101 sends the acoustic parameters to the voice synthesizing server 20.

The voice synthesizing server 20 receives at the data receiving unit 210the data (acoustic parameters-in-time-series) from the client 10, and the data control unit 270 determines the type of the received data (acoustic parameters) and controls so as to output the data to the corresponding circuit. At this time, the client 10 sends acoustic parameters-in-time-series as transmission data, and they are sent to the waveform generating unit 24.

The waveform generating unit 24 generates voice waveforms according to the voice-parameters-in-time-series, and the waveform encoding unit 25 encodes and compresses the data of the generated voice waveforms. Then, the data sending unit 260 sends the encoded voice waveforms to the client 10.

The client 10 receives, at the waveform receiving unit 13, the encoded voice waveforms from the voice synthesizing server 20, and the waveform decoding unit 14 decodes the encoded voice waveforms. Then, the voice output unit 15 outputs the decoded voice waveforms as voice.

In the above described embodiments 2 and 3, the voice synthesizing server 20 performs the generation of acoustic parameters and subsequent processes when the clients send it pronunciation symbols, while it performs the generation of voice waveform and subsequent processes when the clients send it acoustic parameters, thereby reducing the load of the voice synthesizing server 20.

The client 10 is provided with the data control unit 130 (FIG. 4) as in the voice synthesizing server 20 although it is not shown in FIG. 18 or 19, and the data control unit 270 in the voice synthesizing server 20 informs the data control unit 130 in the client 10 of the type of the data to be sent according to the load of the LAN and the load of the voice synthesizing server 20.

For example, when the voice synthesizing server 20 is charged with a large load, it is desirable that the client 10 takes over more processes. Therefore, the data control unit 270 in the voice synthesizing server 20 instructs the data control unit 130 in the client 10 to send data of the type generated by the client 10.

If the voice synthesizing server 20 is charged with a small load, the processes performed by the client 10 can be taken over by the voice synthesizing server 20. Therefore, even though the client 10 has the function of generating pronunciation symbols, for example, the data control unit 130 in the client 10 is instructed to send text data. Likewise, even though the client 10 has the function of generating acoustic parameters, for example, the data control unit 130 in the client 10 is instructed to send text data or pronunciation symbols. Thus, the load of the client 10 can be reduced.

At this time, the data outputted to the LAN from the client 10 are text data having data volume smaller than that of pronunciation symbols, or text data or pronunciation symbols having data volume smaller than that of acoustic parameters. Thus, the traffic in the LAN can be greatly reduced.

As described above, functions can be shared between the client 10 and the voice synthesizing server 20. However, it is not limited to an instruction from the data control unit 270 in the voice synthesizing server 20 to the data control unit 130 in the client 10. For example, the data control unit 130 in the client 10 can communicate with the data control unit 270 in the voice synthesizing server 20 to receive CPU load information and LAN load information, and can determine, according to the information, the type of the data to be sent by the data control unit 130 in the client 10.

<Embodiment 4>

Figure 20:
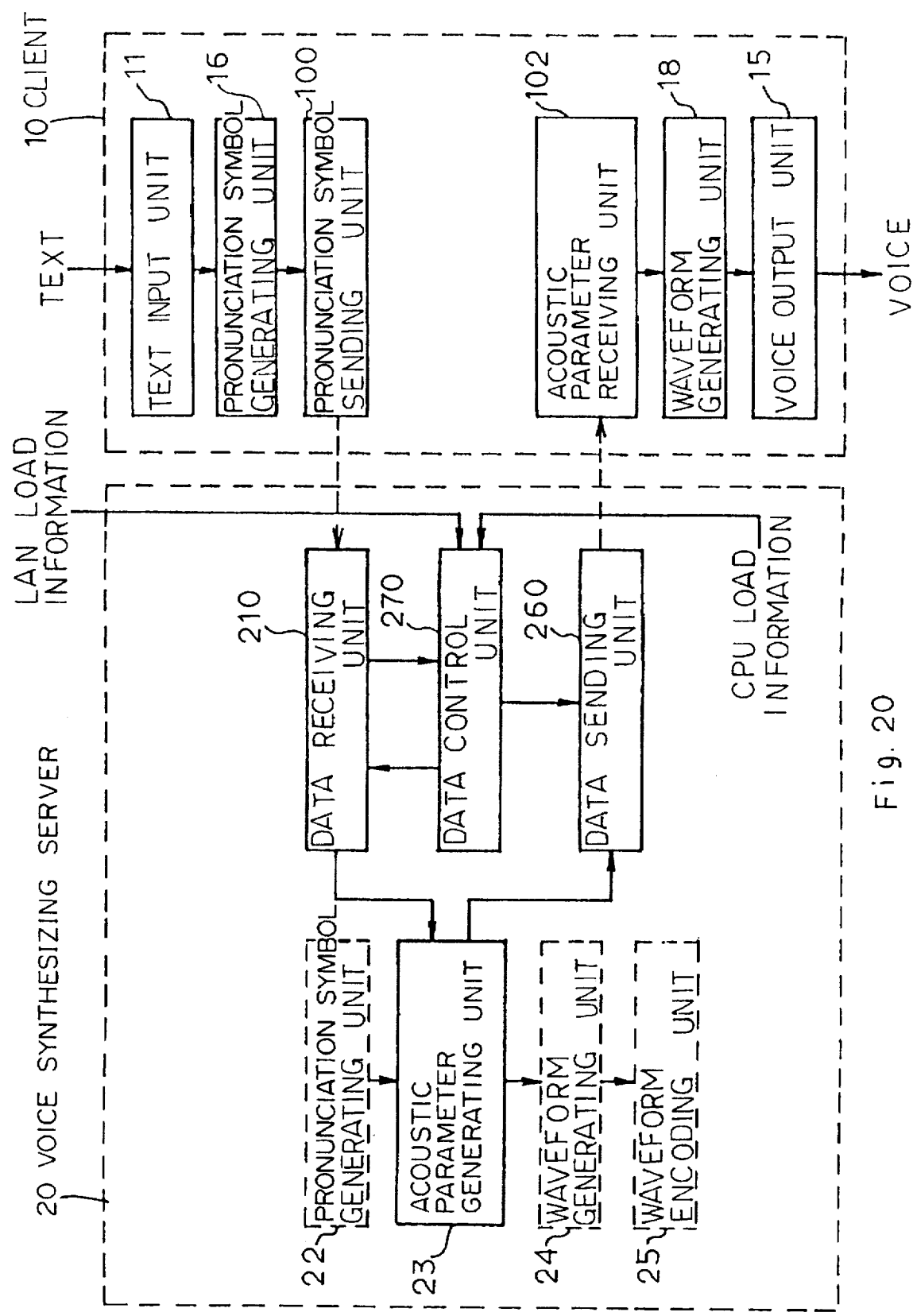
FIG. 20 shows embodiment 4 of the present invention.

FIG. 20 shows the configuration of the system in embodiment 4 of the present invention in which the client 10 includes a waveform generating unit 18.

The client 10 shown in FIG. 20 includes the text input unit 11, the pronunciation symbol generating unit 16, a pronunciation symbol sending unit 100 as the data sending unit 110, an acoustic parameter receiving unit 102 as the data receiving unit 120, the waveform generating unit 18, and the voice output unit 15.

In FIG. 20, when the user inputs text data to the text input unit 11, the pronunciation symbol generating unit 16 converts them to pronunciation symbol strings indicating how the text data are pronounced, and the pronunciation symbol sending unit 100 sends the pronunciation symbol strings to the voice synthesizing server 20.

The voice synthesizing server 20 receives at the data receiving unit 210 the data (pronunciation symbol strings) sent by the client 10, and the data control unit 270 determines the type of the received data. In this case, the received data are pronunciation symbol strings. Therefore, the data receiving unit 210 sends the received phonetic strings to the acoustic parameter generating unit 23 according to the instruction of the data control unit 270. Then, the acoustic parameter generating unit 23 converts the pronunciation symbol strings to the voice-parameters-in-time-series.

When the voice synthesizing server 20 sends voice data to the client 10, the data control unit 270 determines the type of the data to be sent according to the load of the LAN, the load of its CPU, and the type of the data generated by the receiving client 10. In this case, the receiving client 10 comprises the waveform generating unit 18. Therefore, the data control unit 270 sends to the client 10 the voice-parameters-in-time-series generated by the acoustic parameter generating unit 23 in place of voice waveforms when the voice synthesizing server 20 is charged with a large load, while it instructs the waveform generating unit 24 to generate voice waveforms and send them to the client 10 when the voice synthesizing server 20 is charged with a small load.

The acoustic parameter receiving unit 102 in the client 10 receives the voice-parameters-in-time-series from the voice synthesizing server 20, and the waveform generating unit 18 generates voice waveform according to the voice-parameters-in-time-series. Then, the voice output unit 15 outputs the voice waveforms. When the voice synthesizing server 20 sends the voice waveforms, the voice waveforms received by the acoustic parameter receiving unit 102 are outputted to the voice output unit 15.

The type of the data received by the acoustic parameter receiving unit 102 can be determined by the acoustic parameter receiving unit 102. Otherwise, it can be determined by the data control unit 130 (FIG. 4) provided in the client 10, so that the received data are selectively outputted to the waveform generating unit 18 or the voice output unit 15.

In the above described embodiment, if the client 10 has the function of generating waveforms, the voice synthesizing server 20 can send, to the client 10, voice-parameters-in-time-series without generating voice waveforms. Therefore, the load of the voice synthesizing server 20 can be reduced. Furthermore, in this case, the data outputted to the LAN from the voice synthesizing server 20 are voice-parameters-in-time-series having data volume smaller than that of voice waveforms. Thus, the traffic in the LAN can be greatly reduced.

Figure 21:
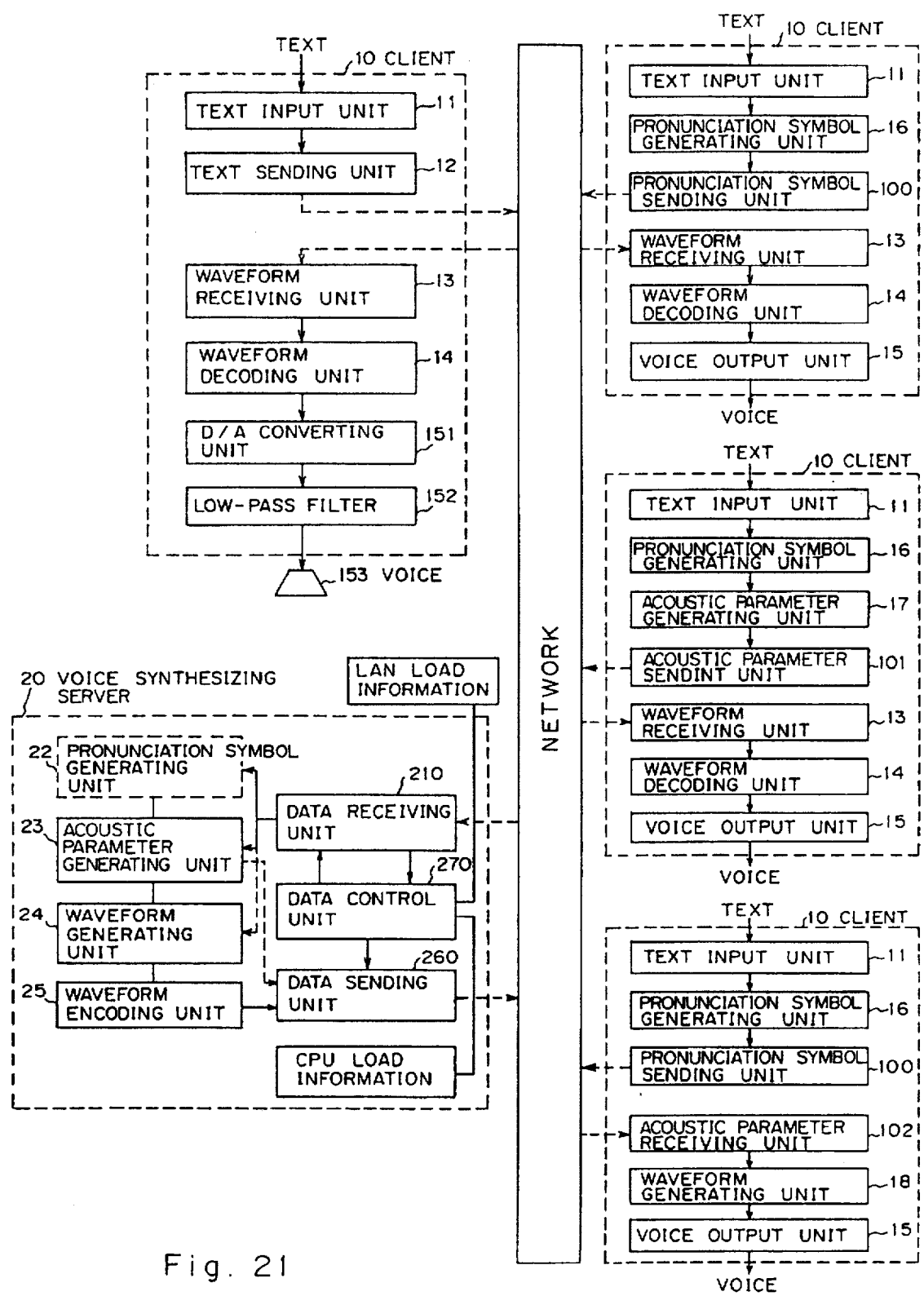
FIG. 21 is the view of the system comprising the clients in embodiments 1 through 4.

FIG. 21 shows the configuration of the speech synthesis system comprising the client 10 and the voice synthesizing server 20 in the above described embodiments 1 through 4.

The operation of the system is described for both cases where the voice synthesizing server 20 is charged with a large load and a small load.

When the server 20 is charged with a large load, it is desirable that the processes performed by the voice synthesizing server 20 are shared by the client 10 as much as possible. Therefore, the data control unit 270 in the voice synthesizing server 20 instructs the data control units in the clients 10 (not shown in figures) to send data of the type generated by each of them.

Accordingly, when a client 10 sends data to the voice synthesizing server 20, a client 10 having the function of generating text data sends the text data to the voice synthesizing server 20, a client 10 having the function of generating pronunciation symbols sends the pronunciation symbol strings to the voice synthesizing server 20, and a client 10 having the function of generating acoustic parameters sends the voice-parameters-in-time-series to the voice synthesizing server 20.

When the voice synthesizing server 20 sends data to the client 10, it does not generate voice waveforms, but sends voice-parameters-in-time-series to the corresponding client 10 to make it generate voice waveforms if the client 10 has the function of generating waveforms and the voice synthesizing server 20 is charged with a large load.

If the voice synthesizing server 20 is charged with a large load as described above, its load can be reduced by having the client 10 take over the processes of generating pronunciation symbols, acoustic parameters, or voice waveforms.

By contrast, if the voice synthesizing server 20 is charged with a small load, the voice synthesizing server 20 can take over a lot of processes. Therefore, the voice synthesizing server 20 instructs the client 10 to send text data or pronunciation symbols even if the client 10 has the function of generating pronunciation symbols or acoustic parameters. Furthermore, the voice synthesizing server 20 generates voice waveforms and sends them to the client 10 even if the client 10 has the function of generating waveforms.

Thus, the load of the client 10 can be greatly reduced. In this case, the client 10 sends, to the voice synthesizing server 20, data such as text data having data volume smaller than that of pronunciation symbols, pronunciation symbols or text data having data volume smaller than that of acoustic parameters. Thus, heavy traffic in a LAN can be successfully reduced.

According to the above described embodiments, the processes to be performed by the voice synthesizing server 20 can be variable based on the capabilities of the client 10, or the processes shared between the server and the client can be controlled according to the traffic condition of a LAN and the load of the CPU of the voice synthesizing server 20. Thus, the performance of the whole system can be greatly improved.

<Embodiment 5>

Figure 22:
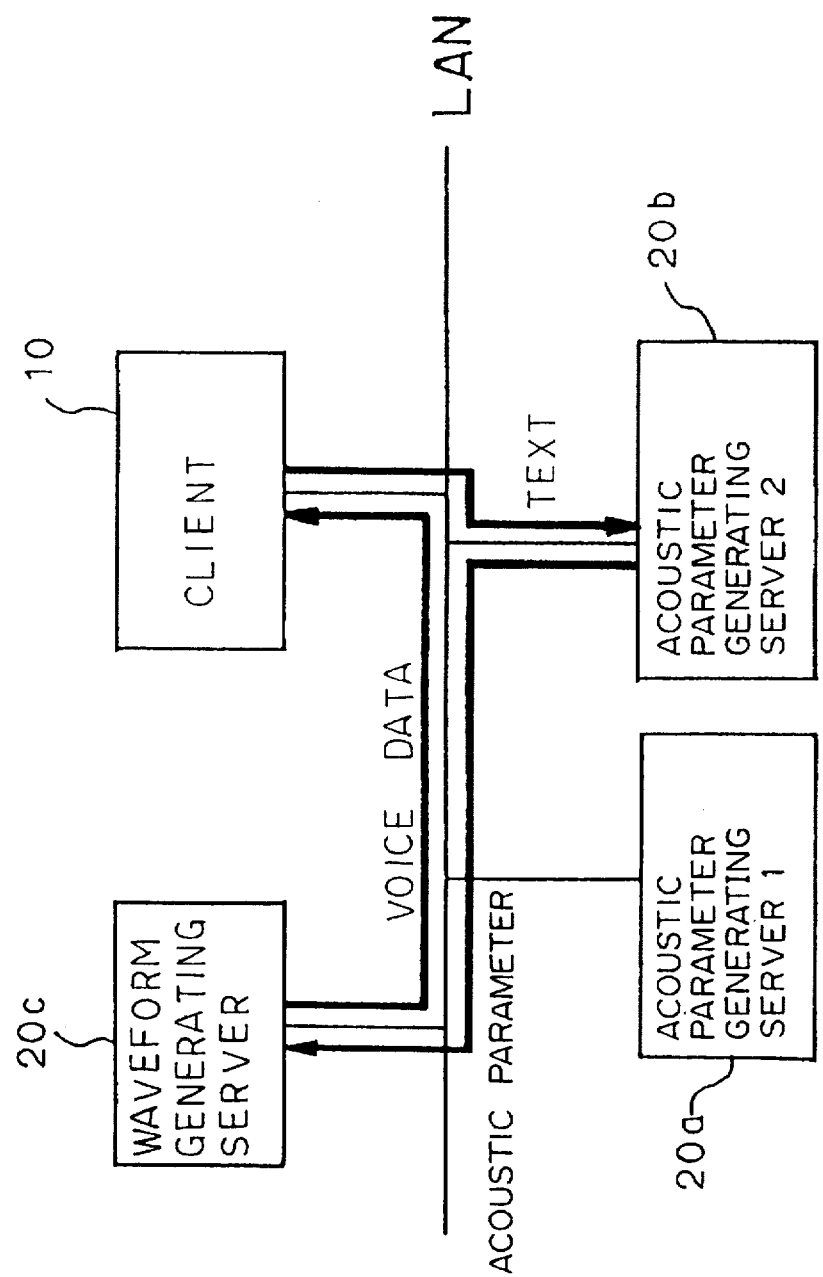
FIG. 22 is a view for explaining embodiment 5 of the present invention.
Figure 23:
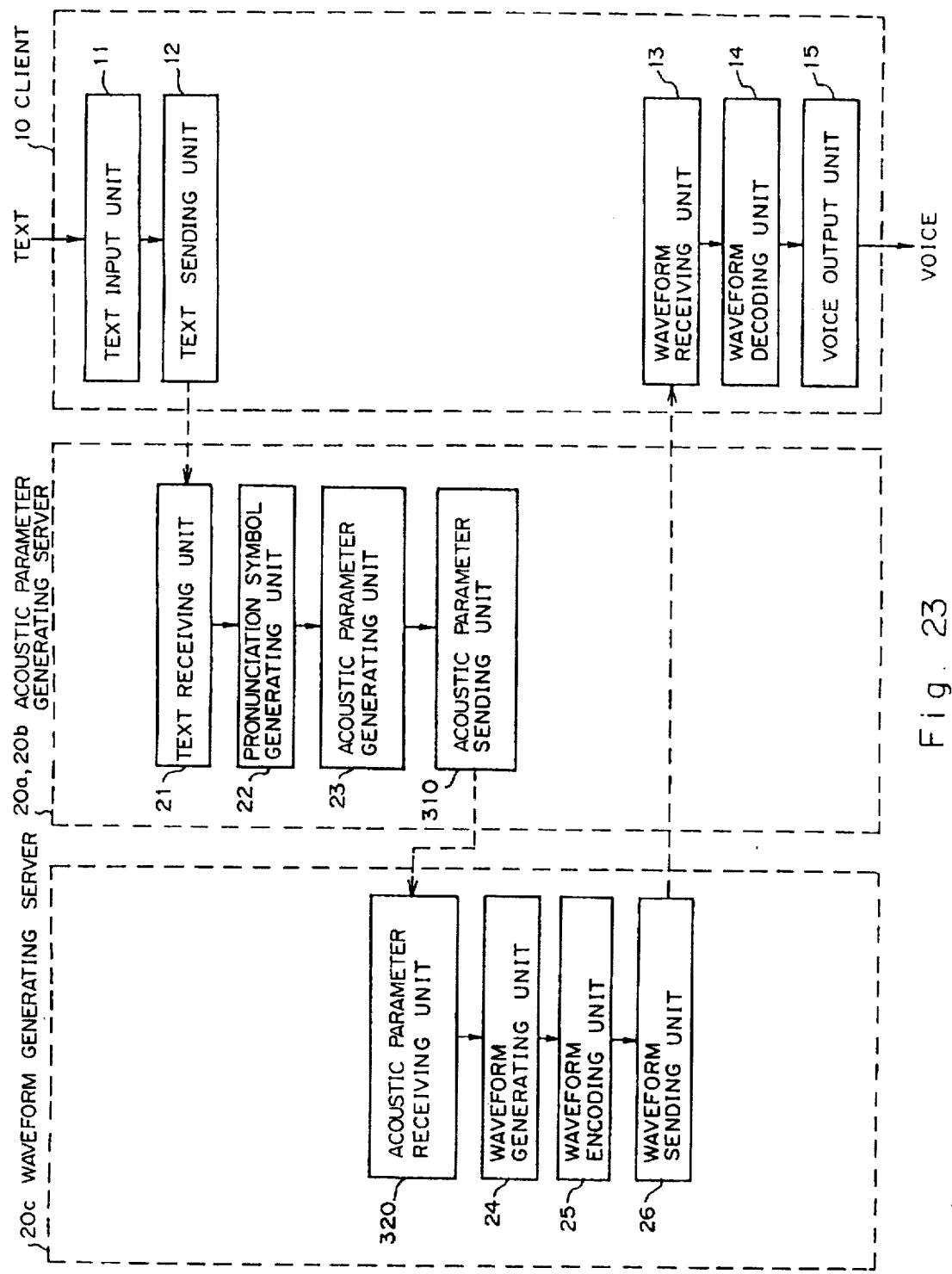
FIG. 23 shows an example of a practical configuration of the embodiment 5.

FIG. 22 shows the concepts of embodiment 5 of the present invention. The embodiment includes acoustic parameter servers 20a for specializing in each voice quality or language, acoustic parameter servers 20b, and common acoustic parameter servers 20c. FIG. 23 shows an example of a practical configuration of the client 10, and the acoustic parameter servers 20a, 20b, and 20c shown in FIG. 23.

The speech synthesis system shown in FIG. 22 is provided with acoustic parameter servers 20a and 20b for specializing in each voice quality (of men, women, children, etc.) or in each language. The client 10 specifies acoustic parameter generating server 20a or 20b, or issues a request for synthesized voice to acoustic parameter generating server 20a or 20b whichever is selected depending on text data and generates voice-parameters-in-time-series.

Acoustic parameter generating server 20a or 20b transmits the generated voice-parameters-in-time-series to waveform generating server 20c. Waveform generating server 20c generates voice waveforms according to the voice-parameters-in-time-series sent from acoustic parameter generating server 20a or 20b, and transmits the voice waveforms to the client 10 which issued the request for synthesized voice. Then, the client 10 receives the voice waveforms and regenerates the voice waveforms as voice.

That is, the text data inputted to the text input unit 11 in the client 10 shown in FIG. 23 are sent to the text receiving unit 21 in acoustic parameter generating server 20a (or 20b).

The pronunciation symbol generating unit 22 in the corresponding acoustic parameter generating server 20a (or 20b) generates pronunciation symbol strings according to the received text data, and the acoustic parameter generating unit 23 generates voice-parameters-in-time-series according to the pronunciation symbol strings. The voice-parameters-in-time-series generated by the acoustic parameter generating unit 23 are sent from the acoustic parameter sending unit 310 to waveform generating server 20c.

Then, waveform server 20c generates voice waveforms according to the voice-parameters-in-time-series, and the voice waveforms are sent to the client 10.

In the present embodiment, a plurality of acoustic parameter generating servers 20a and 20b provided to specialize in each voice quality or language enables text data to be vocally outputted in different voice qualities and languages.

<Embodiment 6>

Figure 24:
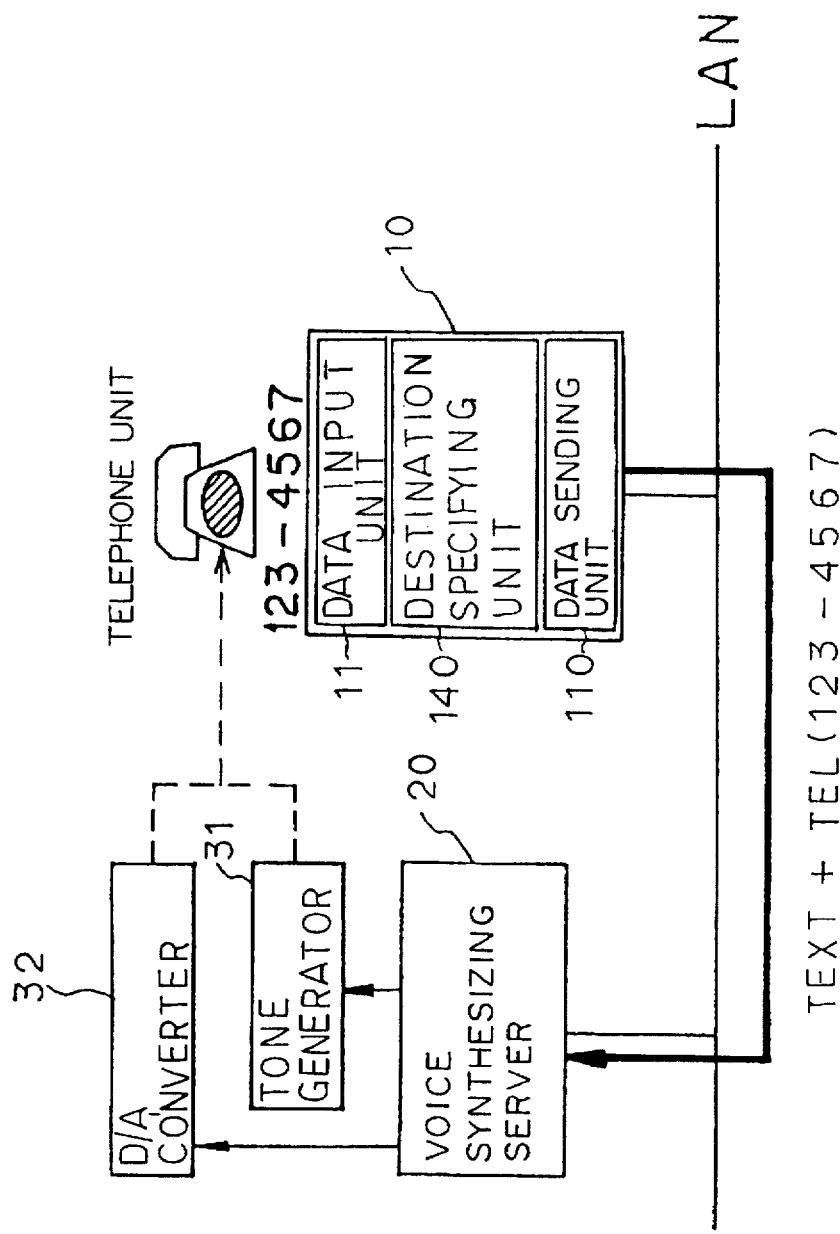
FIG. 24 is a view for explaining embodiment 6 of the present invention.

FIG. 24 shows the concept of embodiment 6 of the present invention. Embodiment 6 shows the case where the client 10, having no D/A converting function, controls so that the voice synthesized according to text data is outputted from a specified telephone unit.

A user of the client 10 having no D/A converting function inputs to text input unit 11 text data to be processed to synthesize voice, and specifies through a destination specifying unit 140, a telephone unit for outputting the voice synthesized from the text data. The client 10 sends, from the data sending unit 110 to the voice synthesizing server 20 connected to a LAN, the text data inputted by the user and the telephone number data of the specified telephone unit.

When the voice synthesizing server 20 receives text data and telephone number data (for example, 123–4567), it generates voice waveforms according to the text data and generates, by means of the tone generator 31, the dial tone of the specified telephone number to call the corresponding telephone unit. When the line is connected, the digital voice waveforms generated by the text data are converted to an analog voice signal by the D/A converter 32 to send it over the telephone line.

In embodiment 6, a user of the client 10 can make a telephone unit at hand output synthesized voice and hear the content of the text data even though the client 10 has no D/A converting function.

<Embodiment 7>

Figure 25:
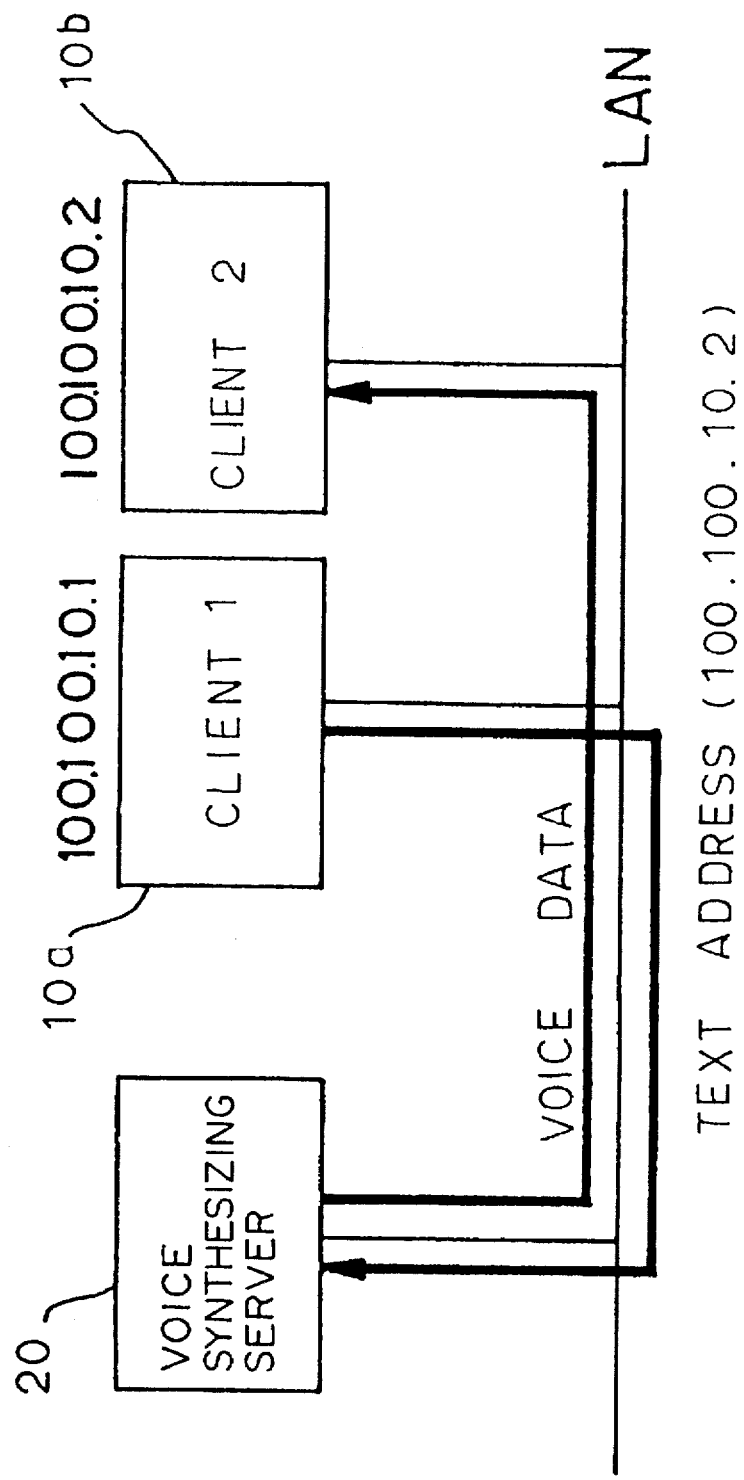
FIG. 25 is a view for explaining embodiment 7 of the present invention.

FIG. 25 shows the concepts of embodiment 7 of the present invention. The embodiment shows that the client 10 having no D/A converting functions, causes the voice synthesized according to the text data to be outputted from another client having a D/A converting function.

A user of client 10a having no D/A converting function inputs to the text input unit, text data to be processed to synthesize voice, and specifies client 10b for outputting the synthesized voice. Client 10a sends, to the voice synthesizing server 20 connected to a LAN, the text data inputted by the user and the address data (for example 100,100.10.2) of Client 10b specified as the destination.

When the voice synthesizing server 20 receives from client 10a, text data and address data for specifying specific client 10b, it generates the voice waveforms corresponding to the text data. Then, the voice synthesizing server 20 sends the generated voice waveforms to client 10b of the specified address. Client 10b regenerates voice from the received voice waveforms.

In embodiment 7, a user of client 10a having no D/A converting function can hear synthesized voice through another client 10b.

<Embodiment 8>

Figure 26:
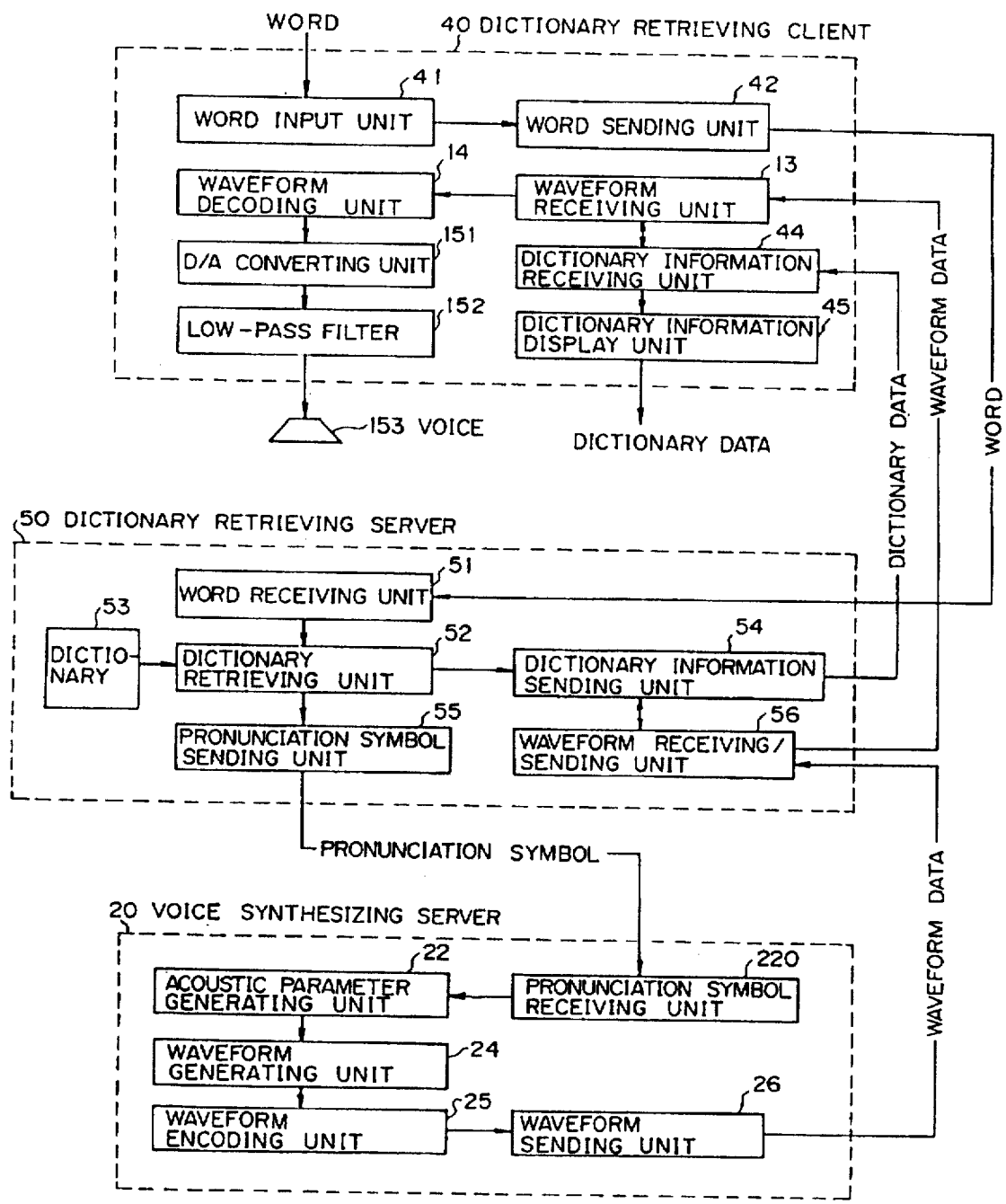
FIG. 26 is a view for explaining embodiment 8 of the present invention.

FIG. 26 shows the configuration of the client and the server of embodiment 8. In embodiment 8, the dictionary retrieving client 40, the dictionary retrieving server 50, and the voice synthesizing server 20 are connected to a LAN; the pronunciation of a word retrieved by the dictionary retrieving server 50 is processed to synthesize voice by the voice synthesizing server 20; the dictionary information of the word retrieved by the dictionary retrieving client 40 is displayed; and the pronunciation of the word is vocally outputted.

In FIG. 26, the dictionary retrieving client 40 includes the word input unit 41 for inputting a word to be retrieved, the word sending unit 42 for sending the inputted word to the dictionary retrieving server 50, the waveform receiving unit 13 for receiving voice waveform data, the dictionary information receiving unit 44 for receiving the retrieving word data, the dictionary information display unit 45 for displaying the dictionary information received by the dictionary information receiving unit 44, the waveform decoding unit 14 for decoding the encoded waveform data received by the waveform receiving unit 43, the D/A converting unit 151 for converting the decoded digital waveform data to analog voice waveforms, the low-pass filter 152 for removing the high frequency component in the analog voice waveforms, and the speaker 153 for vocally outputting the analog voice waveforms which have passed through the low-pass filter 152.

The dictionary retrieving server 50 includes the word receiving unit 51 for receiving a word to be retrieved sent from the dictionary retrieving client 40, the dictionary retrieving unit 52 for retrieving the dictionary information containing the meaning of a word to be retrieved from the dictionary 53 and the pronunciation symbols representing the pronunciation of the word, etc., the pronunciation symbol sending unit 55 for sending to the voice synthesizing server 20 the pronunciation symbol retrieved by the dictionary retrieving unit 52, the dictionary information sending unit 54 for sending to the dictionary information client 40 the dictionary information retrieved by the dictionary retrieving unit 52, and a waveform receiving/sending unit 56 for receiving waveform data from a voice synthesizing server 20 and sending the waveform data to the dictionary retrieving client 40.

The configuration of the voice synthesizing server 20 is basically the same as that of the preceding embodiments. In The present embodiment, the server furthermore includes the pronunciation symbol receiving unit 220 for receiving as a data receiving unit, the pronunciation symbol sent from the dictionary retrieving server 50.

Next, the operation of the system shown in FIG. 26 is described below. When a user inputs to the word input unit 41, a word to be retrieved, the inputted word is sent from the word transmitting unit 42 to the dictionary retrieving server 50.

In the dictionary retrieving server 50, the word retrieving unit 52 retrieves from the word dictionary 53 word data received by the word receiving 51, outputs to the dictionary information sending unit 54 the dictionary information indicating the meaning of words in the retrieved data, and outputs to the pronunciation symbol sending unit 55 the pronunciation symbol strings indicating the pronunciation of the words. The phonetic symbol sending unit 55 sends a phonetic symbol string to the voice synthesizing server 20.

In the voice synthesizing server 20, when the pronunciation symbol receiving unit 220 receives pronunciation symbol strings from the dictionary retrieving server 50, the acoustic parameter generating unit 22 generates voice-parameters-in-time-series according to the pronunciation symbol strings, and the waveform generating unit 24 generates voice waveforms according to the generated voice-parameters-in-time-series. Then, the waveform encoding unit 25 encodes the voice waveforms, and the waveform sending unit 26 sends the encoded waveform data to the dictionary retrieving server 5. The voice waveforms are compressed by a well-known waveform encoding method such as ADPCM, etc.

When the waveform receiving/sending unit 56 receives waveform data from the voice synthesizing server 20, the dictionary retrieving server 50 instructs the dictionary information sending unit 54 to send dictionary information in synchrony with the transmission of the waveform data.

In the dictionary retrieving client 40, when the waveform receiving unit 13 receives waveform data from the dictionary retrieving server 50, the waveform decoding unit 14 decodes the encoded waveform data and the D/A converting unit 151 converts the digital voice waveforms to the analog voice waveforms. The analog voice waveforms converted by the D/A converting unit 151 are vocally outputted as the pronunciation of the word to the speaker 153 through the low-pass filter 152. Simultaneously, the dictionary information of the word received by the dictionary information receiving unit 44 is displayed on the dictionary information display unit 45.

The voice waveforms generated by the voice synthesizing server 20 are sent to the dictionary retrieving client 40 through the dictionary retrieving server 50 so that the dictionary information retrieved by the dictionary retrieving server 50 and the voice synthesized by the voice synthesizing server 20 can be simultaneously presented to a user. Additionally, the dictionary retrieving server 50 is provided with a dictionary information buffer and a waveform data buffer (not shown in FIG. 26) for temporarily storing the dictionary information of retrieved words and waveform data. With this configuration, when any of these words is requested again to be retrieved, the word need not be retrieved nor processed to synthesize voice. Therefore, the retrieving result can be presented to a user in a short time.

In the embodiment, the pronunciation of a word requested to be retrieved is outputted together with the dictionary information of the word. Therefore, a user can easily obtain both the meaning and the pronunciation of the word easily and exactly. Additionally, in this embodiment, since the voice synthesizing server 20 synthesizes voice according to the pronunciation symbol of each word stored in the dictionary 53, voice data need not be stored for each word in the dictionary 53 in the dictionary retrieving server 50. Thus, the capacity of the storage unit for storing the data necessary for synthesizing voice can be minimized.

One word or one phrase or sentence includes a plurality of words can be outputted vocally.

<Embodiment 9>

Figure 27:
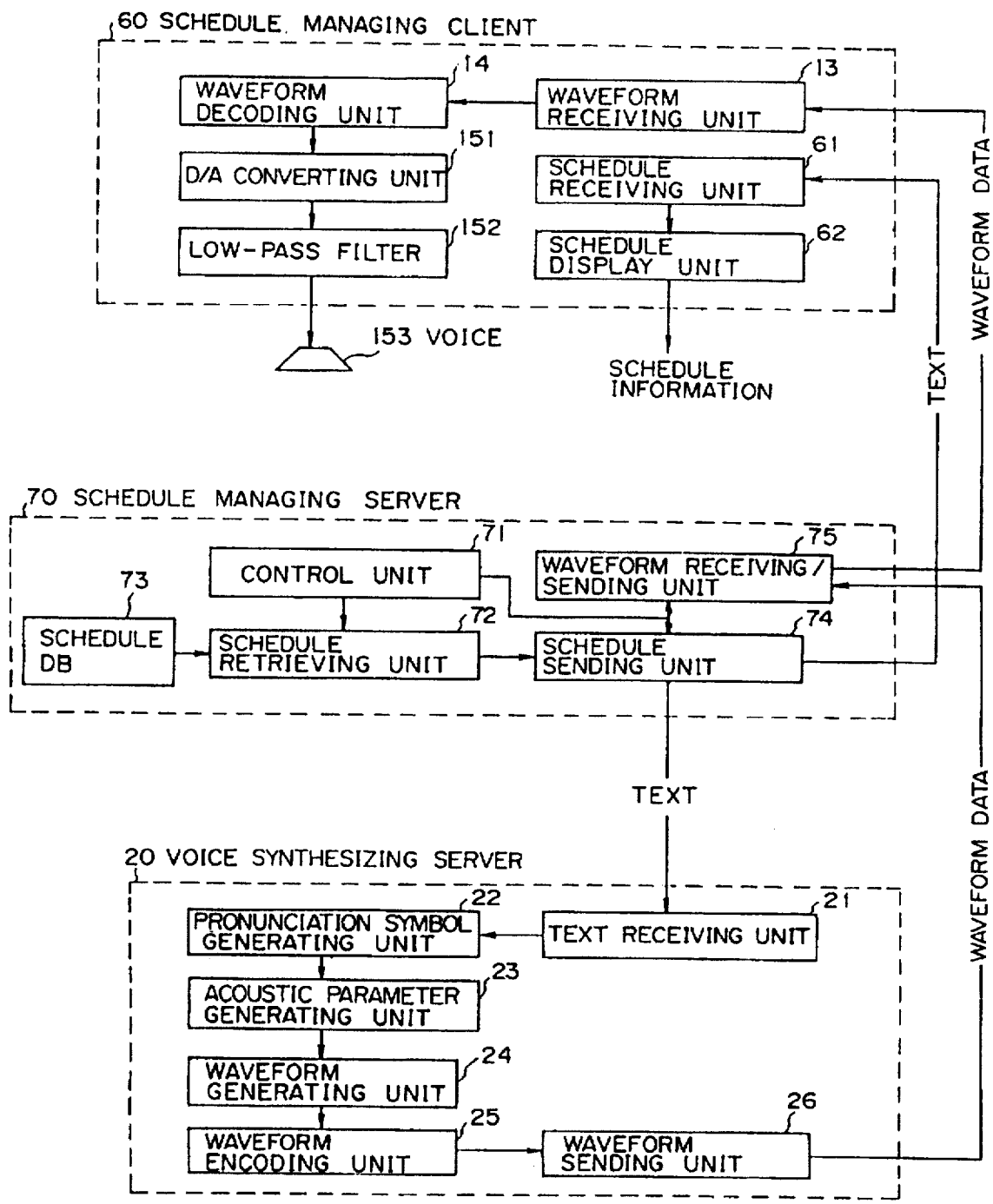
FIG. 27 is a view for explaining embodiment 9 of the present invention.

Next, FIG. 27 shows embodiment 9 of the present invention. Embodiment 9 vocally informs a user of the schedule information managed by the schedule managing server 70. In the following description, the parts also used in the preceding embodiments are assigned the numbers assigned there.

In the schedule managing server 70, the control unit 71 controls the schedule retrieving unit 72 at predetermined time intervals so as to retrieve the schedule information registered in the schedule data base 73 and check whether or not the schedule information corresponding to the present time has been registered. If the corresponding schedule information has been registered, the schedule information is sent from the schedule sending unit 74 to the voice synthesizing server 20.

In the voice synthesizing server 20, when the text receiving unit 21 receives the schedule information (text data) from the schedule managing server 7, the pronunciation symbol generating unit 22 generates pronunciation symbol strings according to the received text data, and the acoustic parameter generating unit 23 generates voice-parameters-in-time-series according to the pronunciation symbol strings. Then, the waveform generating unit 24 generates voice waveforms according to the voice-parameters-in-time-series, and the waveform encoding unit 25 encodes the voice waveforms and outputs them to the waveform sending unit 26. Then, the waveform sending unit 26 sends the encoded waveform data to the schedule managing server 70.

In the schedule managing server 70, when the waveform receiving/sending unit 75 receives waveform data from the voice synthesizing server 20, the waveform data are sent to the schedule managing client 60 together with the schedule information in synchrony with the schedule sending unit 74.

In the schedule managing client 60, when the schedule receiving unit 61 receives text data from the schedule managing server 70, the schedule displaying unit 62 displays the text data. Simultaneously, the waveforms indicating the content of the schedule received by the waveform receiving unit 13 are decoded by the waveform decoding unit 14, and D/A converted by the D/A converting unit 151 and vocally outputted through the speaker 153.

When it is not necessary to display information and vocally output the information synchronously as in the schedule management, voice waveform data are sent directly to the schedule managing client 60 without the schedule managing server 70.

In the present embodiment, schedule information can be outputted as voice information as well as character information. Therefore, users are informed of schedules more exactly.

According to the present invention, the volume of data transmitted to a LAN and heavy traffic in the LAN can be greatly reduced by sending encoded voice waveforms from a voice synthesizing server and decoding the encoded voice waveforms by a client.

If a client has the function of generating pronunciation symbols or acoustic parameters, the load of a voice synthesizing server can be reduced by sending to the client, the data of the type generated by it and receiving and processing the data by a voice synthesizing server. Furthermore, loads can be appropriately shared between a client and a voice synthesizing server and the efficiency of the whole system can be greatly improved by changing the type of data to be sent from a client to a voice synthesizing server according to the load of a LAN, the load of a voice synthesizing server, etc. or by changing the type of data to be sent from the voice synthesizing server to the client.

Furthermore, a user of a client having no D/A converting function can obtain synthesized voice by sending the voice waveforms generated by a voice synthesizing server to another client having a D/A converting function or to a specified telephone unit.

Additionally, the pronunciation of a retrieved word can be easily and exactly informed of by vocally outputting the pronunciation of the word together with the dictionary information of the word. Furthermore, the content of a schedule can be informed to a user without fail by vocally outputting the schedule information.

What is claimed is:

1. A speech synthesis system comprising:
a plurality of clients for issuing a request for synthesized voice, at least one of said clients comprising:
text input means for inputting text data to be outputted vocally,
pronunciation symbol generating means for generating pronunciation symbols according to text data inputted to said text input means,
data sending means for sending data to be processed to synthesize voice,
data receiving means for receiving data, and
voice output means for outputting synthesized voice according to said received data; and
a voice synthesizing server for generating synthesized voice according to data sent from said clients, comprising:
data receiving means for receiving data sent from said clients,
pronunciation symbol generating means for generating pronunciation symbols according to text data received by said data receiving means,
acoustic parameter generating means for generating acoustic parameters according to said pronunciation symbols,
waveform generating means for generating voice waveforms according to said acoustic parameters,
data control means for controlling such that on receiving text data said data receiving means outputs the data to said phonetic symbol generating means, and on receiving pronunciation symbols it outputs the symbols to said acoustic parameter generating means, and
data sending means for sending to said clients voice waveforms generated by said waveform generating means,
said clients and said voice synthesizing server being connected to a local area network (LAN).

2. The speech synthesis system according to claim 1, wherein:
each of said clients further comprises acoustic parameter generating means for generating acoustic parameters according to pronunciation symbols generated by said pronunciation symbol generating means; and
said data control means in said voice synthesizing server, controls said data receiving means so that on receiving text data, said data receiving means outputs the text data to said pronunciation symbol generating means, on receiving pronunciation symbols said data receiving means outputs the pronunciation symbols to said acoustic parameter means, and on receiving acoustic parameters said data receiving means outputs the acoustic parameters to said waveform generating means.

3. The speech synthesis system according to claim 2, wherein:
said client further comprises data control means for controlling data sending means such that said data sending means sends text data, pronunciation symbols, or acoustic parameters according to the instruction of said data control means in said voice synthesizing server.

4. The speech synthesis system according to claim 2, wherein:
said client further comprises data control means for controlling said data sending means such that said data sending means sends text data, pronunciation symbols, or acoustic parameters according to load information of said voice synthesizing server and load information of said local area network, the load information being received from said data control means in said voice synthesizing server.

5. The speech synthesis system according to claim 1, wherein:
said client further comprises waveform generating means for generating voice waveforms according to acoustic parameters received by said data receiving means, and said data control means in said voice synthesizing server, controls said data sending means such that said data sending means sends acoustic parameters or voice waveforms depending on at least a load of said client and of said network when said client issues a request for synthesized voice comprises said waveform generating means.

6. The speech synthesis system according to claim 5, wherein:

said client further comprises data control means for controlling such that on receiving acoustic parameters, said data receiving means outputs the acoustic parameters to said waveform generating means, and on receiving voice waveforms, said data receiving means outputs the voice waveforms to said voice outputs means.

7. A speech synthesis system comprising:

a plurality of clients for issuing a request for synthesized voice, at least one of said clients comprising:

text input means for inputting text data to be outputted vocally, pronunciation symbol generating means for generating pronunciation symbols according to text data inputted to said text input means, data sending means for sending data to be processed to synthesize voice, data receiving means for receiving data, waveform decoding means for decoding encoded voice waveforms received by said data receiving means, and voice output means for vocally outputting said decoded waveforms, and a voice output synthesizing server for generating voice waveforms according to data sent from said clients, comprising:

data receiving means for receiving data from said client, pronunciation symbol generating means for generating pronunciation symbols according to text data received by said data receiving means, acoustic parameter generating means for generating acoustic parameters according to said pronunciation symbols, waveform generating means for generating voice waveforms according to claim acoustic parameters, data control means for controlling said data receiving means such that on receiving text data, said data receiving means outputs the text data to said pronunciation symbol generating means, and on receiving pronunciation symbols said data receiving means outputs the pronunciation symbols to said acoustic parameter generating means, waveform encoding means for encoding voice waveforms generated by said waveform generating means, and data sending means for sending to said client the encoded voice waveforms, said clients and said voice synthesizing server being connected to a local area network (LAN).

* * * * *